United States Patent [19]

Sugita

[11] Patent Number: 5,276,842
[45] Date of Patent: Jan. 4, 1994

[54] DUAL PORT MEMORY

[75] Inventor: Mitsuru Sugita, Hyogo, Japan

[73] Assignee: Mitsubishi Denki Kabushiki Kaisha, Tokyo, Japan

[21] Appl. No.: 682,826

[22] Filed: Apr. 9, 1991

[30] Foreign Application Priority Data

Apr. 10, 1990 [JP] Japan .................. 2-95308

[51] Int. Cl.⁵ .................. G06F 12/00; G06F 13/00
[52] U.S. Cl. .................. 395/425; 365/230.05; 365/189.04; 364/DIG. 1
[58] Field of Search .................. 395/425; 364/DIG.; 365/230.05, 189.04

[56] References Cited

U.S. PATENT DOCUMENTS

| | | | |
|---|---|---|---|
| 4,860,263 | 8/1989 | Mattausch | 365/230.05 |
| 4,937,781 | 6/1990 | Lee et al. | 364/DIG. 2 |
| 5,146,572 | 9/1992 | Bailey et al. | 395/425 |
| 5,157,775 | 10/1992 | Sanger | 395/425 |

OTHER PUBLICATIONS

"Mikroprozessor-Kommunikation mit Mikrocontrollern ohne Wait-States", by David Bell et al. No. 3, vol. 3, Feb. 1987, pp. 44-46, Elektronik Applikation.

Primary Examiner—Alyssa H. Bowler
Attorney, Agent, or Firm—Lowe, Price, LeBlanc & Becker

[57] ABSTRACT

A dual port memory 50 comprises two decoders 9a, 9b, and two sense amplifiers 14a, 14b, associated with a memory cell array 100. The dual port memory 50 can be accessed by a CPU 6 of the A system side and a CPU 7 of the B system side simultaneously. The occurrence of contention between the accesses of CPUs 6 and 7 with respect to the same memory cell is detected by an access contention detecting circuit 51. In response to contention detection, a control signal generating circuit 52 generates various control signals. The A port side and B port side of the dual port memory 50 each is provided with write data latches 53a, 53b, read data latches 54a, 54b, switches 55a-57b, select switches 58a, 58b, and tri-state buffers 59a and 59b, respectively, to perform arbitration all the time of access contention, in accordance with the control signal from control signal generating circuit 52.

9 Claims, 25 Drawing Sheets

|   | A PORT | B PORT | DATA READ OUT FROM MEMORY CELL | DATA WRITTEN INTO MEMORY CELL |
|---|---|---|---|---|
| (1) | READ | READ | NORMAL | |
| (2) | READ | WRITE | INDEFINITE | NORMAL |
| (3) | WRITE | READ | INDEFINITE | NORMAL |
| (4) | WRITE | WRITE | | INDEFINITE |

FIG. 16A
(a) CASE 1
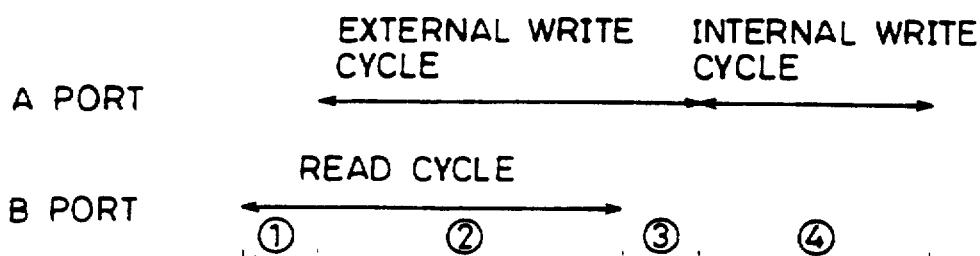
(b) CASE 2
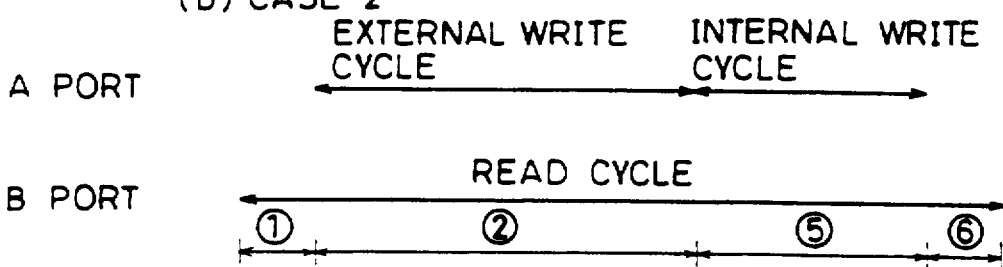
(c) CASE 3
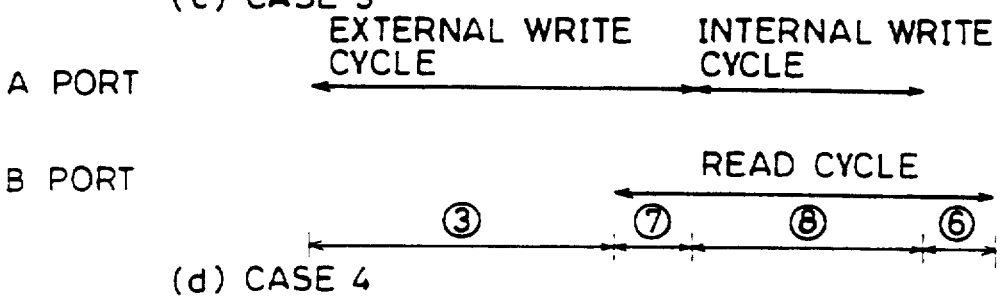
(d) CASE 4
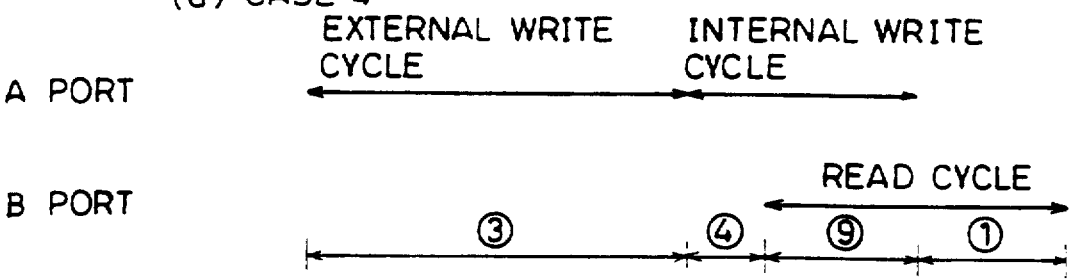

FIG. 16B

CASE 1

| STATE | A PORT (WRITE) | B PORT (READ) |
|---|---|---|
| ① | | (READ CYCLE) MEMORY CELL → READ DATA LATCH → B SYSTEM |
| ② | (EXT. WRITE CYCLE) A SYSTEM → WRITE DATA LATCH | (READ CYCLE) MEMORY CELL → READ DATA LATCH → B SYSTEM |
| ③ | (EXT. WRITE CYCLE) A SYSTEM → WRITE DATA LATCH | |
| ④ | (INT. WRITE CYCLE) WRITE DATA LATCH → MEMORY CELL | |

FIG. 16C

CASE 2

| STATE | A PORT (WRITE) | B PORT (READ) |
|---|---|---|
| ① | | (READ CYCLE) MEMORY CELL → READ DATA LATCH → B SYSTEM |
| ② | (EXT. WRITE CYCLE) A SYSTEM → WRITE DATA LATCH | (READ CYCLE) MEMORY CELL → READ DATA LATCH → B SYSTEM |
| ⑤ | (INT. WRITE CYCLE) WRITE DATA LATCH → MEMORY CELL | (READ CYCLE) READ DATA LATCH → B SYSTEM |
| ⑥ | | (READ CYCLE) READ DATA LATCH → B SYSTEM |

FIG. 16D

CASE 3

| STATE | A PORT (WRITE) | B PORT (READ) |
|---|---|---|
| ③ | (EXT. WRITE CYCLE)<br>A SYSTEM<br>→ WRITE DATA LATCH | |
| ⑦ | (EXT. WRITE CYCLE)<br>A SYSTEM<br>→ WRITE DATA LATCH | (READ CYCLE)<br>→ READ DATA LATCH<br>B SYSTEM |
| ⑧ | (INT. WRITE CYCLE)<br>WRITE DATA LATCH<br>→ MEMORY CELL | (READ CYCLE)<br>→ READ DATA LATCH<br>B SYSTEM |
| ⑥ | | (READ CYCLE)<br>READ DATA LATCH<br>B SYSTEM |

FIG. 16E

CASE 4

| STATE | A PORT (WRITE) | B PORT (READ) |
|---|---|---|
| ③ | (EXT. WRITE CYCLE)<br>A SYSTEM<br>→ WRITE DATA LATCH | |
| ④ | (INT. WRITE CYCLE)<br>WRITE DATA LATCH<br>→ MEMORY CELL | |
| ⑨ | (INT. WRITE CYCLE)<br>WRITE DATA LATCH<br>→ MEMORY CELL | (READ CYCLE)<br>MEMORY CELL  READ DATA<br>LATCH → B SYSTEM |
| ① | | (READ CYCLE)<br>MEMORY CELL → READ DATA<br>LATCH → B SYSTEM |

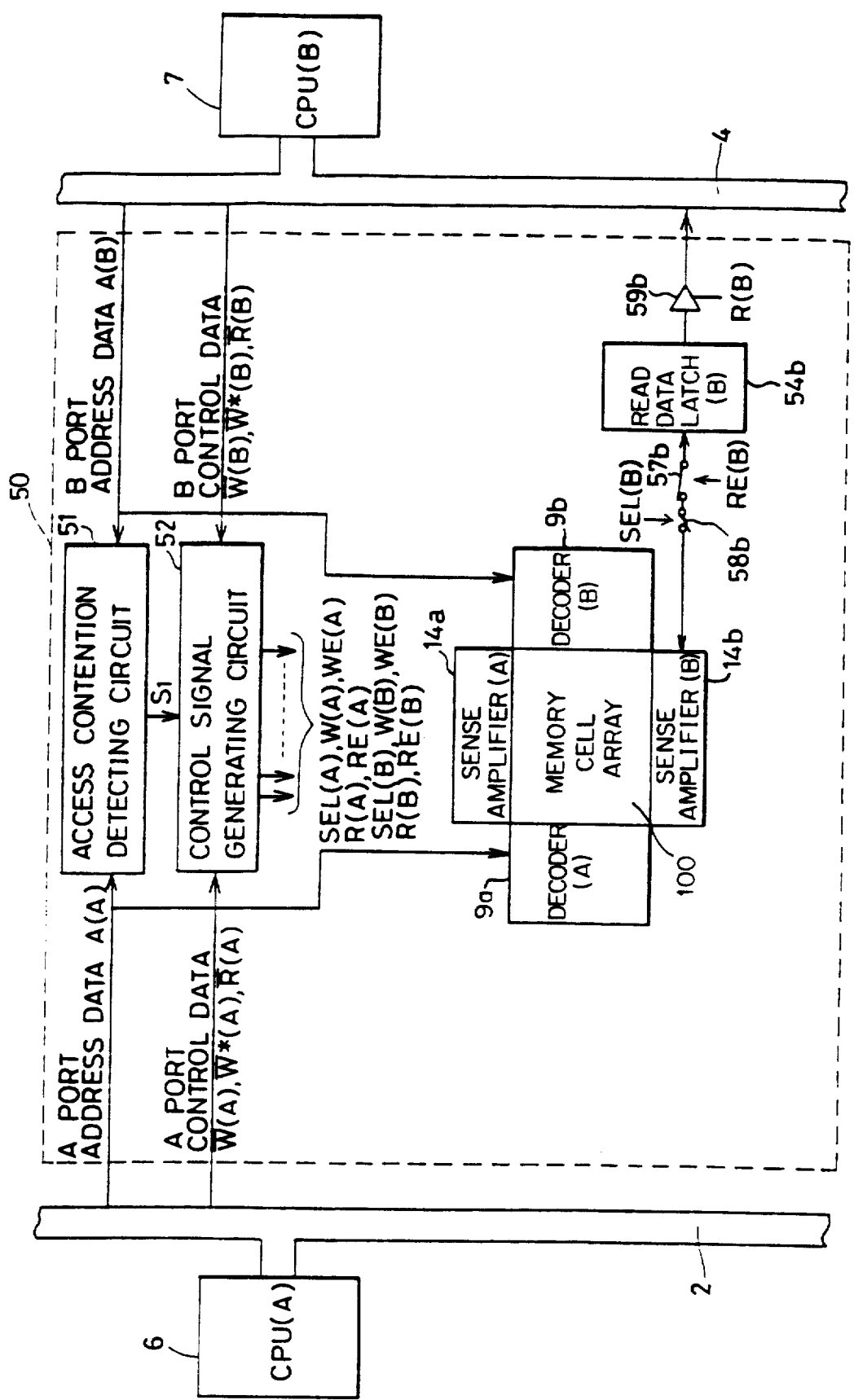

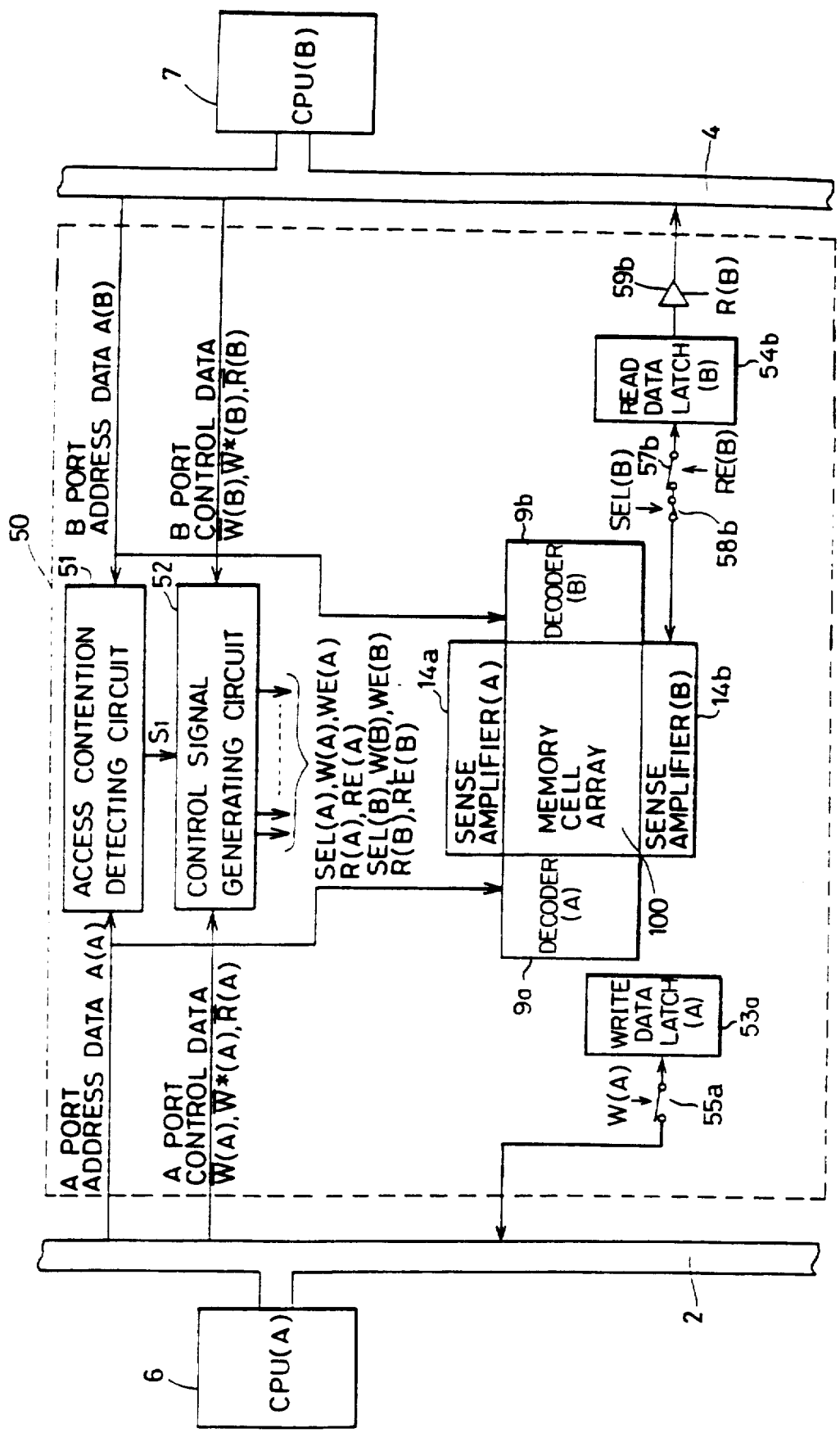
FIG.17B STATE OF ②

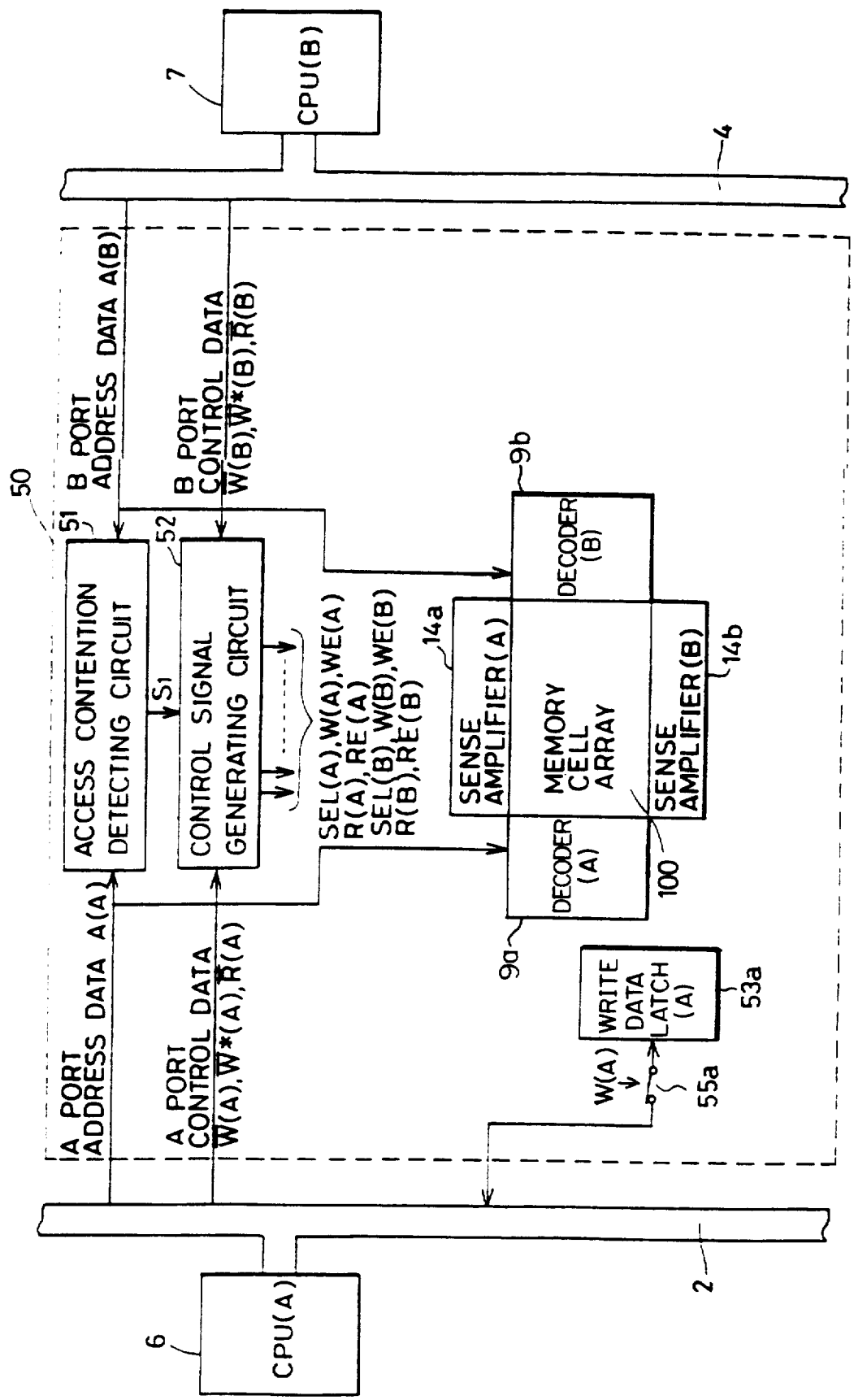

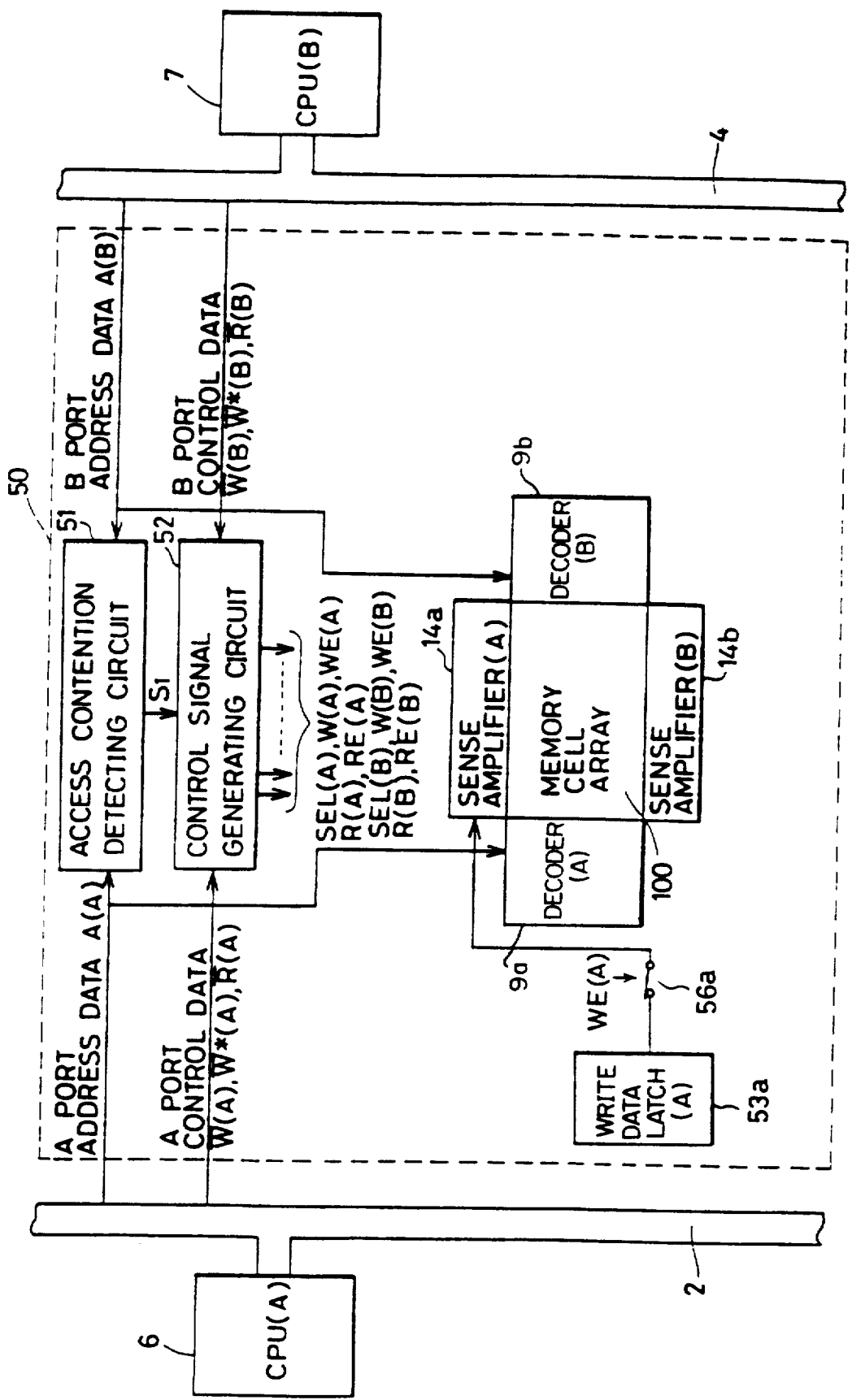
FIG.17D STATE OF ④

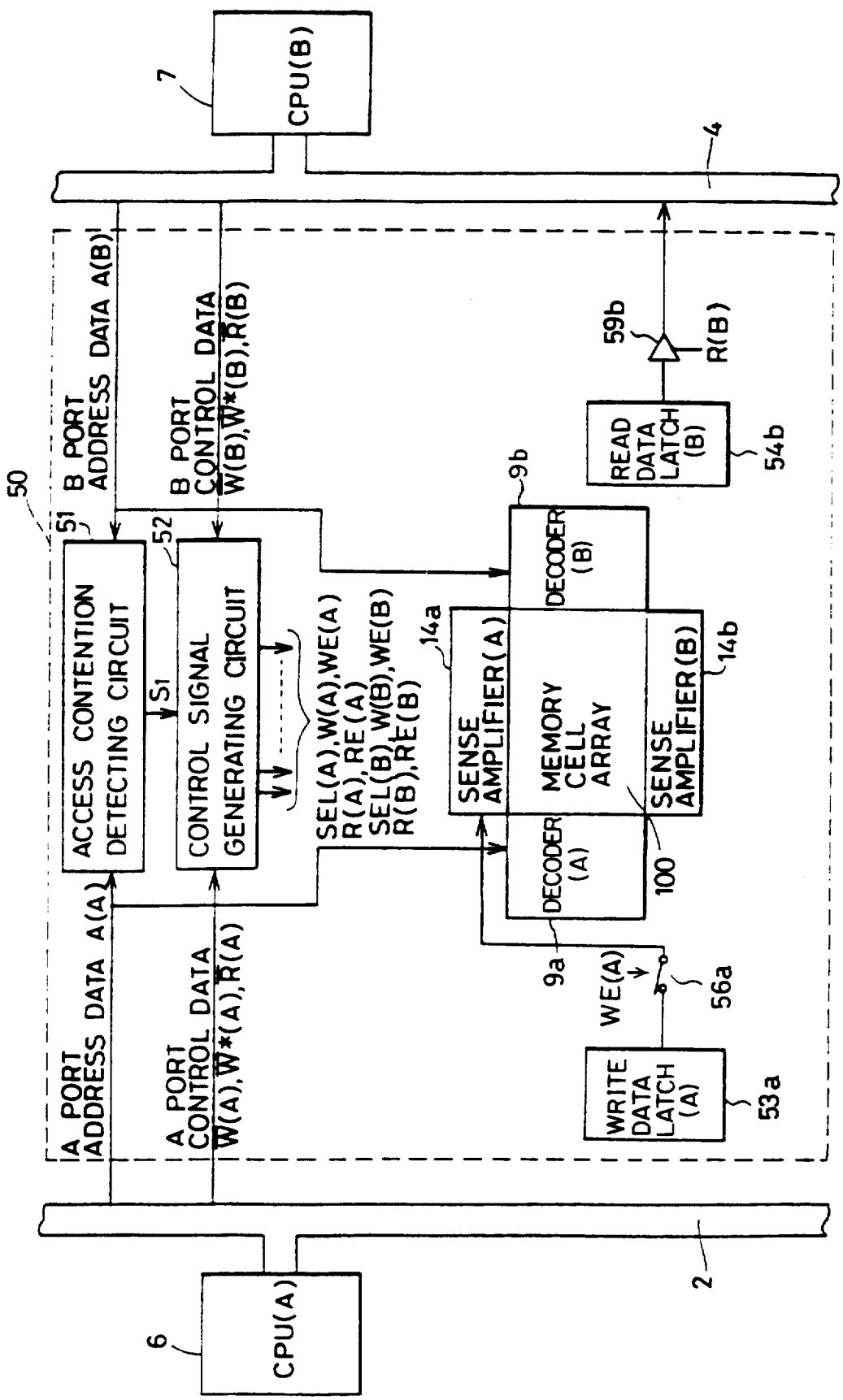
FIG. 17E STATE OF ⑤

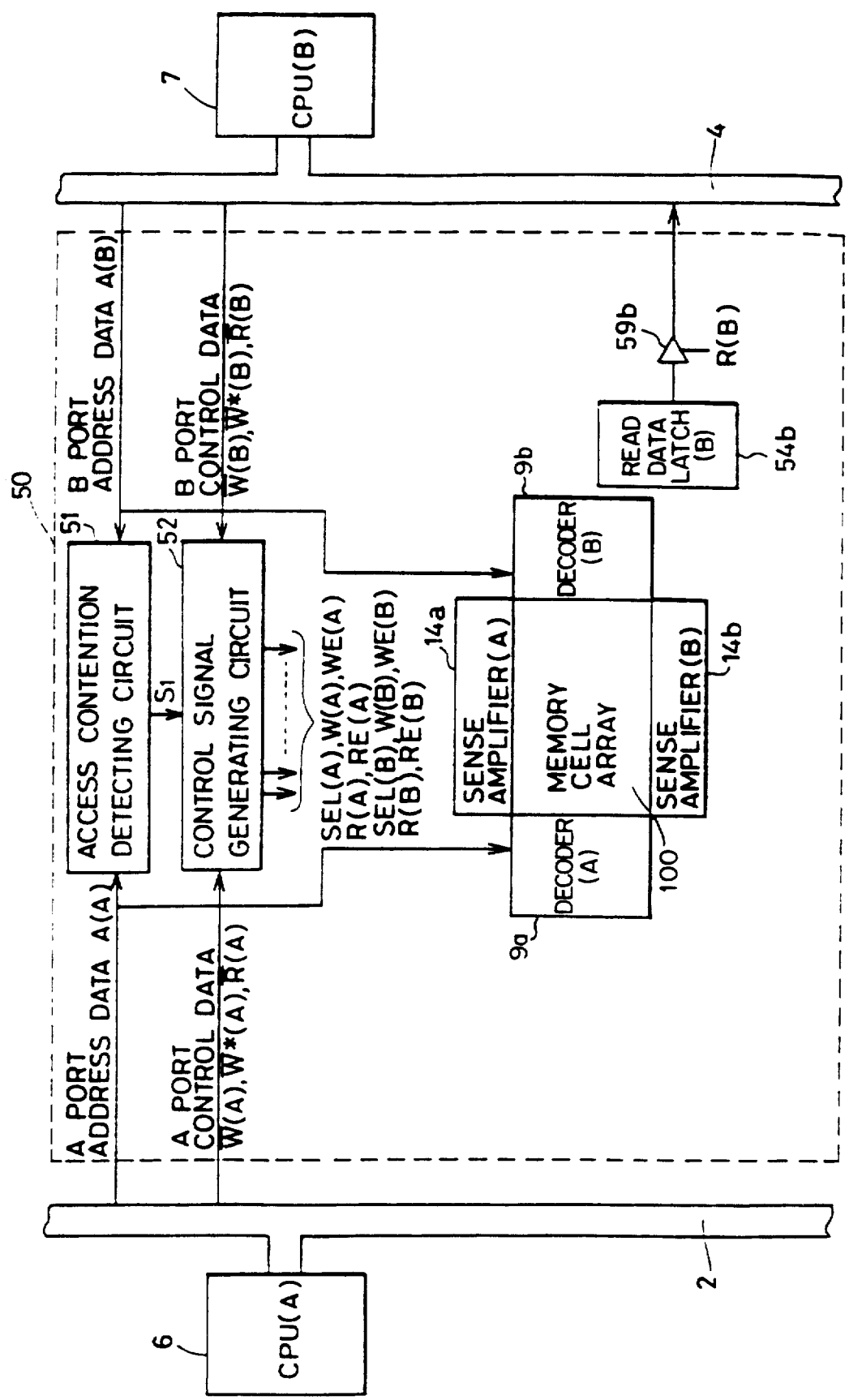
FIG. 17F STATE OF ⑥

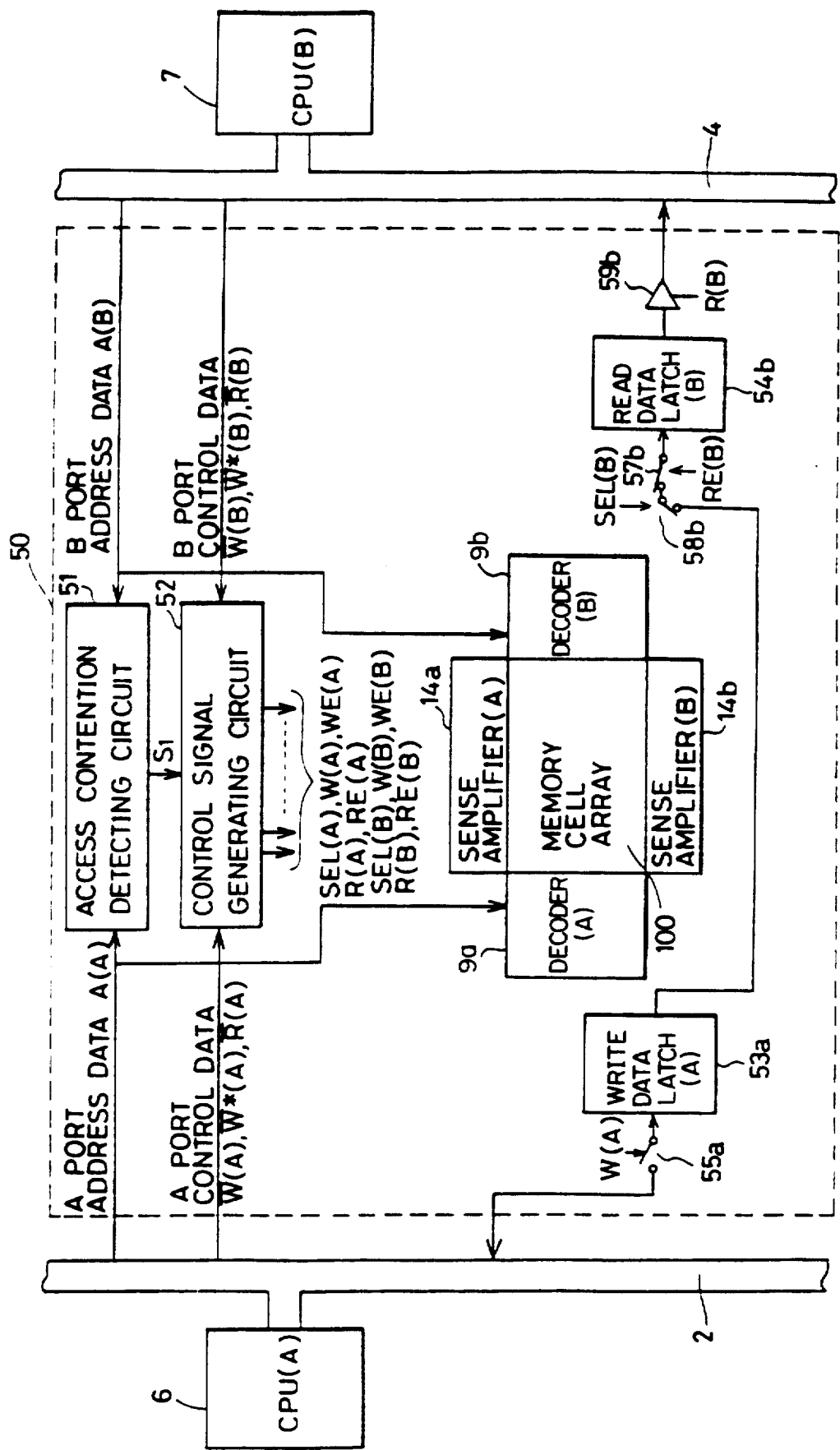
FIG.17G STATE OF ⑦

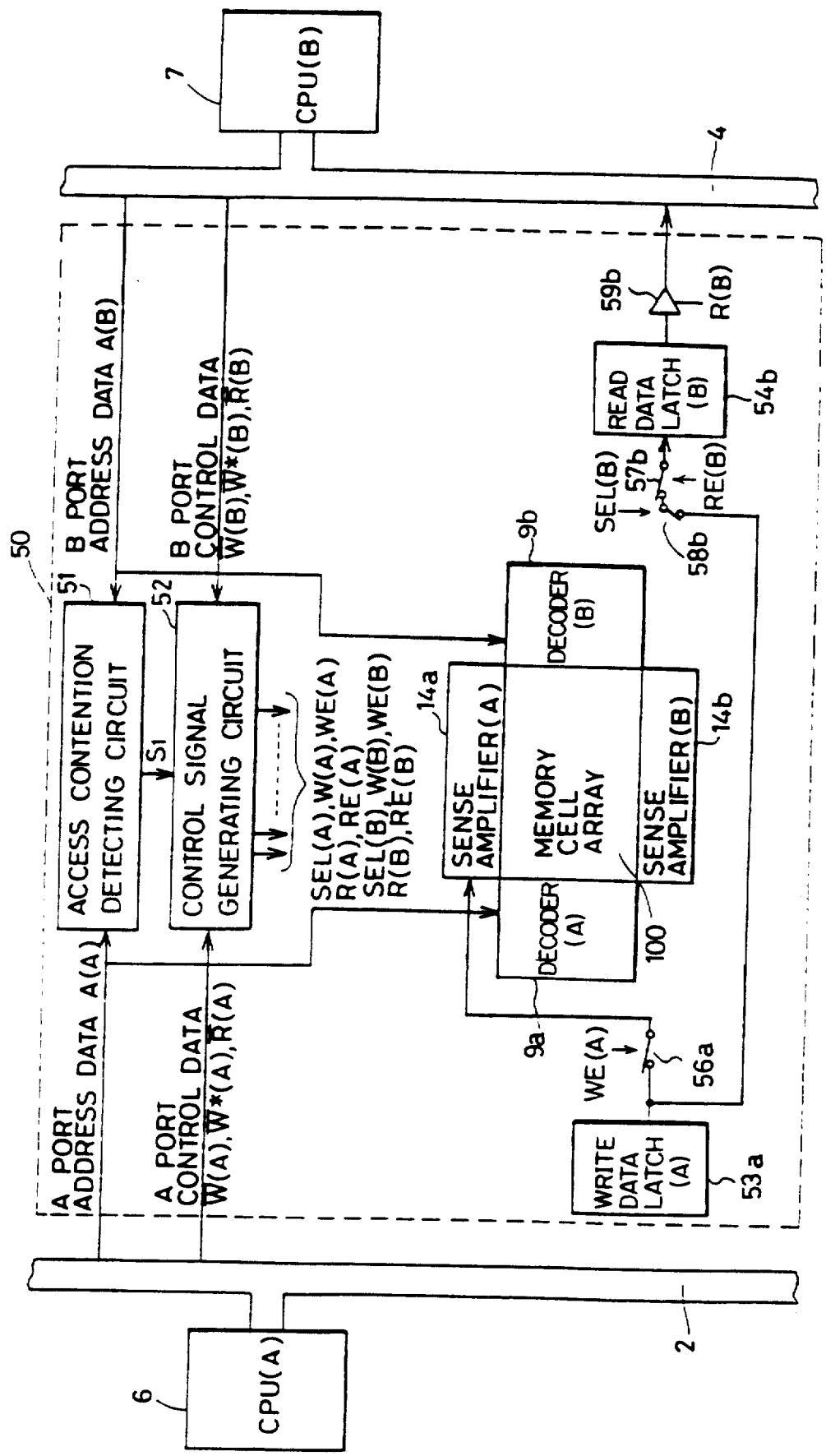
FIG.17H STATE OF ⑧

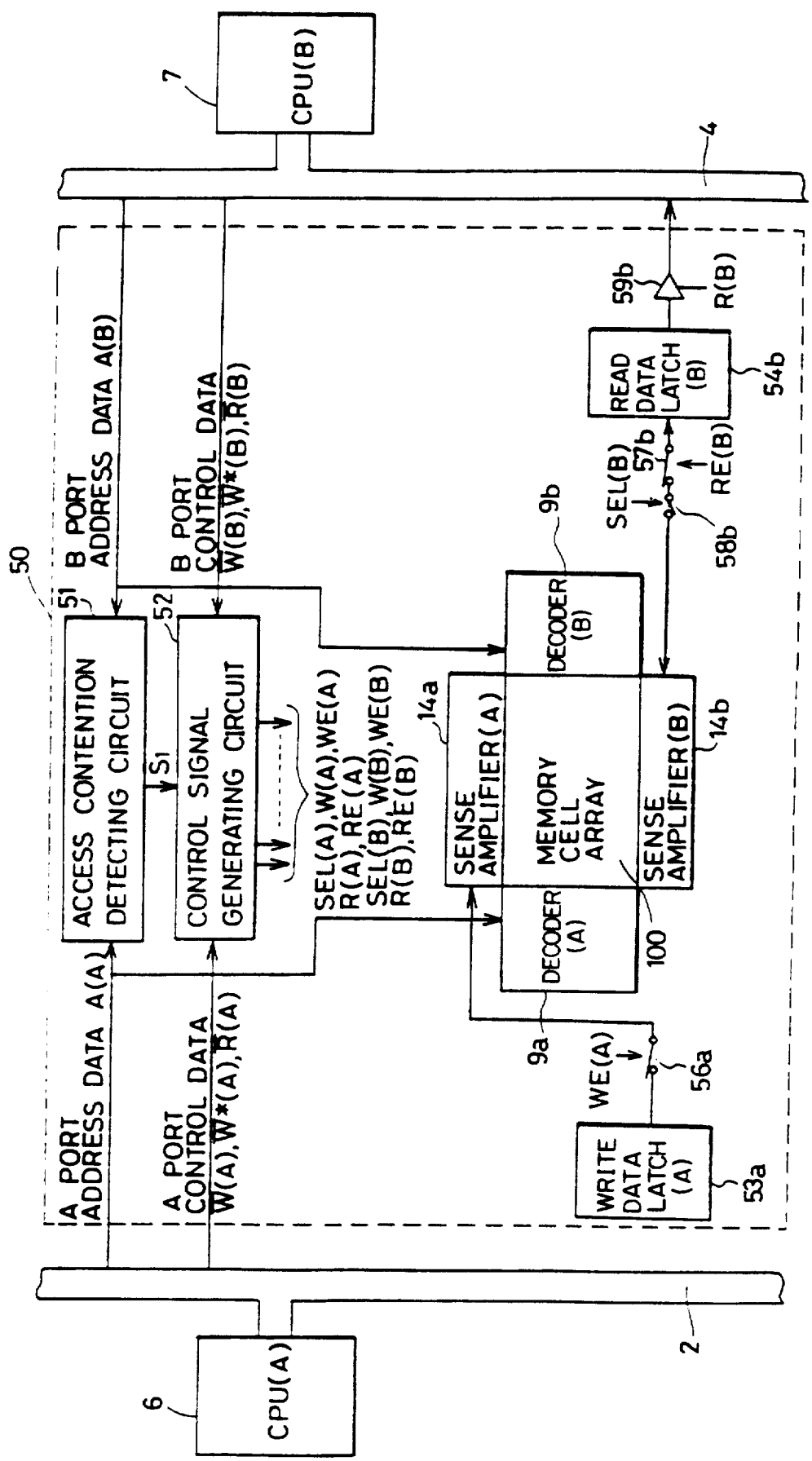
FIG.17I  STATE OF ⑨

DUAL PORT MEMORY

BACKGROUND OF THE INVENTION

1. Field of the Invention

The invention relates generally to a dual port memory comprising two input/output ports, and more particularly to a dual port memory such as one used in data transmission between two microprocessor systems.

2. Description of the Background Technology

FIG. 1 is a block diagram showing a general utilization configuration of a dual port memory. In the figure, a dual port memory 1 has two input/output ports (one is called A port, while the other is called B port hereinafter). A port is connected to an A system 3 via a system bus 2. B port is connected to a B system 5 via a system bus 4. The A system 3 and B system 5 may be any type of system that processes data. For example, in many cases, it is a microprocessor system that includes a CPU. The dual port memory 1 comprises an internal memory means. This memory means is capable of being accessed separately by A system 3 and B system 5.

The above dual port memory 1 is often used for data reception/transmission between A system 3 and B system 5. For example, where A system 3 and B system 5 operate asynchronously, it is difficult to perform data transmission directly between each system. By transmitting data via dual port memory 1, it is possible for each system to input/output data when necessary. Consequently, the throughput of the system will improve. Furthermore, the systems 3 and 5 operate together to allow for the development of a larger system.

There are two conventional access methods for the dual port memory, as will be described hereinafter.

FIG. 2A shows the first access method, in which an address data applied to A port from a CPU 6 of the A system (hereinafter called A port address data) and an address data applied to B port from a CPU 7 of the B system (hereinafter called B port address data) are multiplexed by an address multiplexer 8 to be applied to a decoder 9. The decoder 9 selects one memory cell of a memory cell array 10, in accordance with either A port address data or B port address, applied via address multiplexer 8. The memory cell array 10 has a plurality of memory cells arranged in a matrix manner along the row and column directions. Each row of memory cell 11 has one word line 12 arranged as shown in FIG. 2B. Also, each column of memory cell 11 has one bit line 13. A sense amplifier 14 is dividedly arranged by each bit line 13. Through this divided sense amplifier 14, write data is applied to bit line 13 from CPU 6 or 7, or data read out into bit line 13 is provided to CPU 6 or 7. The decoder 9 selectively activates one of the plurality of word lines 12 in accordance with the applied data. This causes a transfer gate transistor 15 of the selected row to attain a conductive state. Also, decoder 9 selectively enables one of the divided sense amplifiers 14 in accordance with the applied data. This causes the selected memory cell 11 to be connected to CPU 6 or 7 via the corresponding transfer gate transistor 15. As a result, the reading and writing of data, with respect to the selected memory cell 11, is possible.

The second access method is shown in FIG. 3A. A decoder 9a and a sense amplifier 14a for A port, and a decoder 9b and a sense amplifier 14b for B port are associated with a memory cell array 100. The A port address data from CPU 6 is applied to decoder 9a, while B port address data from CPU 7 is applied to decoder 9b. The memory cell array 100 has a plurality of memory cell arranged in a matrix manner along the row and column directions, similar to the memory cell array 10 of FIG. 2A. It should be noted that memory cell array 100 has two word lines 12a and 12b arranged for each row of memory cell 11, and also two bit lines 13a and 13b arranged for each column, as shown in FIG. 3B. Also, two transfer gate transistors 15a and 15b are provided for one memory cell 11. Word line 12a, bit line 13a, and transfer gate transistor 15a are associated with A port. Word line 12b, bit line 13b, and transfer gate transistor 15b are associated with B port. Thus, CPUs 6 and 7 can access, memory cell array 100 at the same time, because the dual port memory of FIG. 3A has the access systems of A port and B port in complete independence.

Since the dual port memory of FIG. 3A is capable of being accessed by CPUs 6 and 7 simultaneously, there will be some cases where access contention from both CPUs 6 and 7 occurs, with respect to the same memory cell. On such an occasion, the state as shown in FIG. 4 occurs in accordance with the type of access from CPUs 6 and 7. First, when read access contention occurs with respect to the same memory cell (the case of FIG. 4 (1)), the data read out from the selected memory cell is normal. Next, when read access and write access contention occurs with respect to the same memory cell (the cases of FIG. 4 (2), (3)), the data read out from the selected memory cell is indefinite (that is to say, whether normal or abnormal, the data cannot be identified), while the data written into the selected memory cell is normal. When contention of write access operation occurs with respect to the same memory cell (the case of FIG. 4 (4)), the data written into the selected memory cell is indefinite.

To solve the above access contention problems, an access contention arbitrating circuit, described hereinafter, was proposed to be provided internally or externally of the dual port memory. When access contention from the systems occurs, the access arbitrating circuit grants an access right to one of the systems, according to a predetermined priority, and temporary halts the access from the other systems. Afterwards, the temporarily halted access is started when a non-contention state is achieved.

FIG. 5 is a system configuration diagram of a dual port RAM incorporating an access arbitrating circuit such as the one disclosed in Japanese Patent Laying-Open No. 62-175992.

The dual port RAM, of FIG. 5 has an output data control circuit 20, and D type flipflops 21a and 21b provided as the access arbitrating circuit. The remaining structure is similar to that of the dual port memory of FIG. 3A, with the same reference numerals being used for the corresponding portions. The output data control circuit 20 is supplied with A port address data A(A) from CPU 6, B port address data A(B) from CPU 7, A port write signal $\overline{WE}$ (A), and B port write signal $\overline{WE}$ (B). The output data control circuit 20 generates output data control signals $\phi A$ and $\phi B$ in accordance with the applied address data and write signals. Output data control signal $\phi A$ is applied to D flipflop 21a. Output data control signal $\phi B$ is applied to D type flipflop 21b. D type flipflop 21a fetches and holds A port output data Dout (A), applied from sense amplifier 14a in response to output data control signal $\phi A$. The Q output of D type flipflop 21a is applied to CPU 6 as A port external output data Dout (A)*. D type flipflop 21b fetches and holds B port output data Dout (B) from sense amplifier 14b, in response to output data control signal φB. The Q output of D flipflop 21b is applied to CPU 7 as B port external output data Dout (B)*.

FIG. 6 shows a further detail of the output data control circuit 20 of FIG. 5. The output data control circuit 20 comprises exclusive logical sum gates $22_0$-$22_n$, OR gate 23, and NOR gates 24a, 24b. The exclusive logical sum gates $22_0$-$22_n$ each detects whether the logic of each address signals A0 (A)-An (a) included in A port address data A (A) coincides with the logic of each address signal A0 (B)-An (B) included in B port address data A (B). OR gate 23 detects whether A port address data A (A) coincides with B port address data A (B) as a whole, by taking the logical sum of the outputs of exclusive logical sum gates $22_0$-$22_n$. NOR gate 24a receives the output of OR gate 23 and B port write signal $\overline{WE}$ (B) to generate an output data control signal φA for A port. NOR gate 24b receives the output of OR gate 23 and A port write signal $\overline{WE}$ (A) to generate an output data control signal φB for B port.

FIG. 7 shows the detailed structure of the D type flipflop 21b of FIG. 5. D type flipflop 21b comprises an inverter 25, and NOR gates 26-29. NOR gates 28 and 29 form the data holding circuit, with each output thereof applied to one input end of the other NOR gates 29 or 28. B port output data Dout (B) from sense amplifier 14 is applied to one input end of NOR gate 26, as well as to one input end of NOR gate 27 via inverter 25. The output data control signal φB from output data control circuit 20 is applied to each other input end of NOR gates 26 and 27. Each of the outputs of NOR gates 26 and 27 are applied to the other input end of NOR gates 28 and 29. NOR gates 26 and 27 determine whether to update the data held in the data holding circuit formed by NOR gates 28 and 29, in response to output data control signal φB.

The structure of D type flipflop 21a is similar to that of the above mentioned D type flipflop 21b, except that the input signal and the output signal are different to those of the above mentioned D type flipflop 21b.

FIG. 8 shows the operation in the case of contention between write access of the A port side and read access of the B port side with respect to the same memory cell, in the conventional dual port RAM shown in FIGS. 5-7. The operation at the time of access contention in the above mentioned dual port RAM is described in reference to the timing chart of FIG. 8.

First, the coincidence of A ports address A (A) with B port address A (B) is detected by exclusive logical sum gates $22_0$-$22_n$, OR gate 23. This causes the output of OR gate 23 to attain the L level. Upon the start of write operation of the A port side, A port write signal $\overline{WE}$ (A) is brought to the L level, to turn output data control signal φB to the H level in response thereto. As a result, D type flipflop 21b has the update operation of the holding data inhibited. Therefore, even though the stored data of the selected memory cell is overwritten by the write operation of the A port side, D type flipflop 21b continues to hold the old data (the data before update). Accordingly, external output data Dout (B) * of B port is held steady. Afterwards, when the write operation of the A port side terminates, A port write signal $\overline{WE}$ (A) is turned to the H level, with output data control signal φB brought to the L level in response thereto. This cancels the inhibition of data update in D type flipflop 21b. Therefore, the holding data of D type flipflop 21b is updated by the output data Dout (B) of B port. That is to say, external output data Dout (B) * of B port is updated to a new data at this time.

In the dual port RAM of FIGS. 5-7, external output data Dout (B) * of B port is updated to a new data (the data newly written into the memory cell) after the termination of write operation of A port, when contention between write of the A port side and read access of the B port side occurs with respect to the same memory cell. Therefore, B system must queue for the fetching of the new data until the write access of A system is terminated. In general, when access contention occurs, a BUSY signal is sent to A system or B system from dual port RAM to hold the access operation of A system or B system on standby. (This is not disclosed in Japanese Patent Laying-Open No. 62-175992). In FIG. 8, the access operation of B system responds to a BUSY signal supplied from B port to be held on standby until the write operation of A system ends. FIG. 9 is a system structure diagram of a conventional multiport memory incorporating an access contention arbitrating circuit such as Japanese Patent Laying-Open No. 63-183678. A multiport memory 34 has three input/output ports, A port, B port, and C port, so that access is possible from three CPUs 31, 32 and 33 simultaneously. In multiport memory 34, address latches 35a, 35b, and 35c latch the address data provided from CPUs 31, 32, and 33, respectively. An address selector 36 selects the address data to be applied to a memory portion 37 from the address data held in address latches 35a-35c. Write data latches 38a, 38b, and 38c latch the write data provided from CPUs 31, 32, and 33, respectively. The write data latched by write data latches 38a, 38b, and 38c are provided to memory portion 37 via write data drivers 39a, 39b, and 39c, respectively. The data read out from memory portion 37 are provided to CPUs 31, 32 and 33 via data ports 40a, 40b, and 40c, respectively. A memory control portion 41 controls address latches 35a-35c, write data latches 38a-38c, data write drivers 39a-39c, data ports 40a-40c, and memory portion 37.

The operation of the conventional multiport memory of FIG. 9 will be explained. When access contention occurs from a plurality of CPUs, memory control portion 41 holds address data and write data in each of latches 35a-35c, 38a-38c, and performs write operation into memory portion 37 after the completion of the other access.

In the multiport memory of FIG. 9, if write access occurs successively from a CPU where a write access is already waiting in the multiport memory, the write access of that CPU will wait at the CPU side.

The aforementioned access arbitrating circuit used in conventional dual port memories or multiport memories may queue the access operation with respect to the system when access contention rises between systems. This results in a disadvantage, whereby the conventional dual port memory could be used only if a function that can cope with the access standby request from the dual port memory (a READY function for example) is provided. Another problem is that the application is limited to the industrial field where some standby time is allowed.

In a system where real time processing is always performed, operation must be realized at identical timing by all means. In such a system, if the timing of standby generation is not known, a dual port memory allowing the generation of such standby time could not be used, no matter how short the standby time.

Furthermore, microcomputers used in small size systems sometimes had a READY terminal (the terminal where standby request signal is applied) deleted, because an increase in the number of LSI terminals leads to increase in cost. In such a system, a dual port memory could not be used, even though it is effective for improving the throughput of the system.

SUMMARY OF THE INVENTION

In view of the foregoing, an object of the present invention is to provide a dual port memory capable of access contention arbitration without issuing an access standby request with respect to the system, even when access contention occurs between systems.

The dual port memory in accordance with the present invention, transmits data between a first system and a second system via first and second input/output ports, and is capable of being accessed by the first system and the second system simultaneously. The dual port memory includes a memory cell array, first and second memory cell selecting means, access contention detecting means, control signal generating means, and first and second transmission control means. The memory cell array includes a plurality of memory cells. The first memory cell selecting means selects one memory cell of the memory cell array in accordance with an address data from the first system. The second memory cell selecting means selects one memory cell from the memory cell array in accordance with an address data from the second system. The access contention detecting means detects the access contention of the first and second system, with respect to the same memory cell in the memory cell array. The control signal generating means generates various control signals in accordance with the control data from the first and second system and the output to the access contention detecting means. The first transmission control means controls the transmission of write/read data between the first system in response to a control signal. The second transmission control means controls the transmission or write/read data between the second system in response to a control signal. The first transmission control means comprises at least a first read data selecting means. The second transmission control means comprises at least a second read data selecting means. The first read data selecting means selects either the data read out from the memory cell or the write data applied from the second system, as the read data provided to the first system, when contention occurs between read access of the first system and write access of the second system with respect to the same memory cell in the memory cell array. The second read data selecting means selects either the data selected from the memory cell or the write data applied from the first system, as the read data provided to the second system, when contention occurs between read access of the second system and write access of the first system with respect to the same memory cell in the memory cell array.

In the present invention, when access contention between the first system and the second system occurs with respect to the same memory cell, the control signal generating means and the first and second transmission control means arbitrate the access contention. The control signal generating means, and the first and second transmission control means process access contention in the internal of the dual port memory, and do not generate an access standby request to the system side. The first and second transmission control means comprise first and second read data selecting means for this purpose. The first and second read data selection means prevent indefiniteness of the read data, by selecting and providing either the data read out from the memory cell or the write data applied from the system of the write access side, as the read data provided to the system of the read access side, when read and write access contention occurs.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 16A is a schematic diagram showing the access contention timing of the four cases in FIG. 15.

FIGS. 16B-16E are diagrams showing the flow of data in A port and B port of the 4 cases of FIG. 15.

FIGS. 17A-17I are diagrams showing the operation state of the dual port RAM corresponding to 1-9 of FIGS. 15 and 16.

DESCRIPTION OF THE PREFERRED EMBODIMENTS

In reference to the figures, a dual port RAM in accordance with one embodiment of the present invention will be described. It is to be understood that this invention is not limited to a dual port memory having a RAM, and is applicable to dual port memories having other types of memories.

Figure 1:
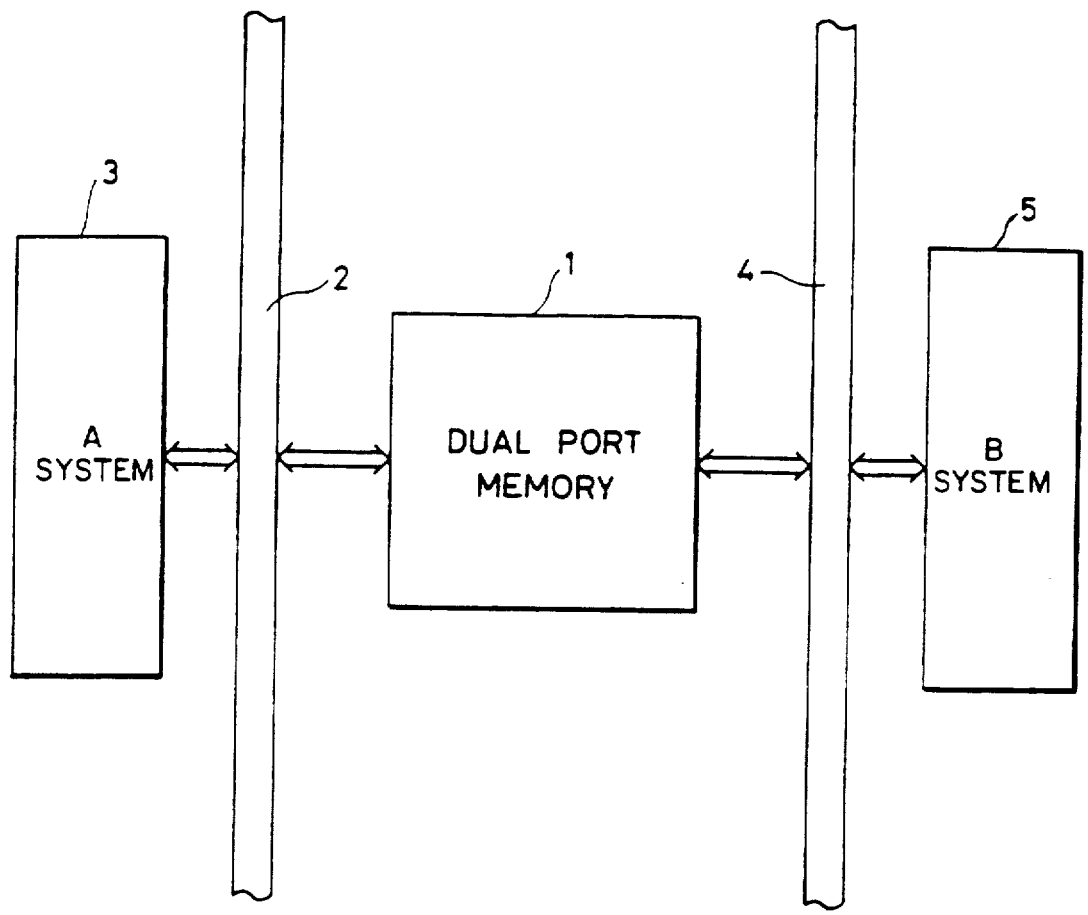
FIG. 1 is a system block diagram showing a general utilization configuration of a dual port memory.
Figure 2A:
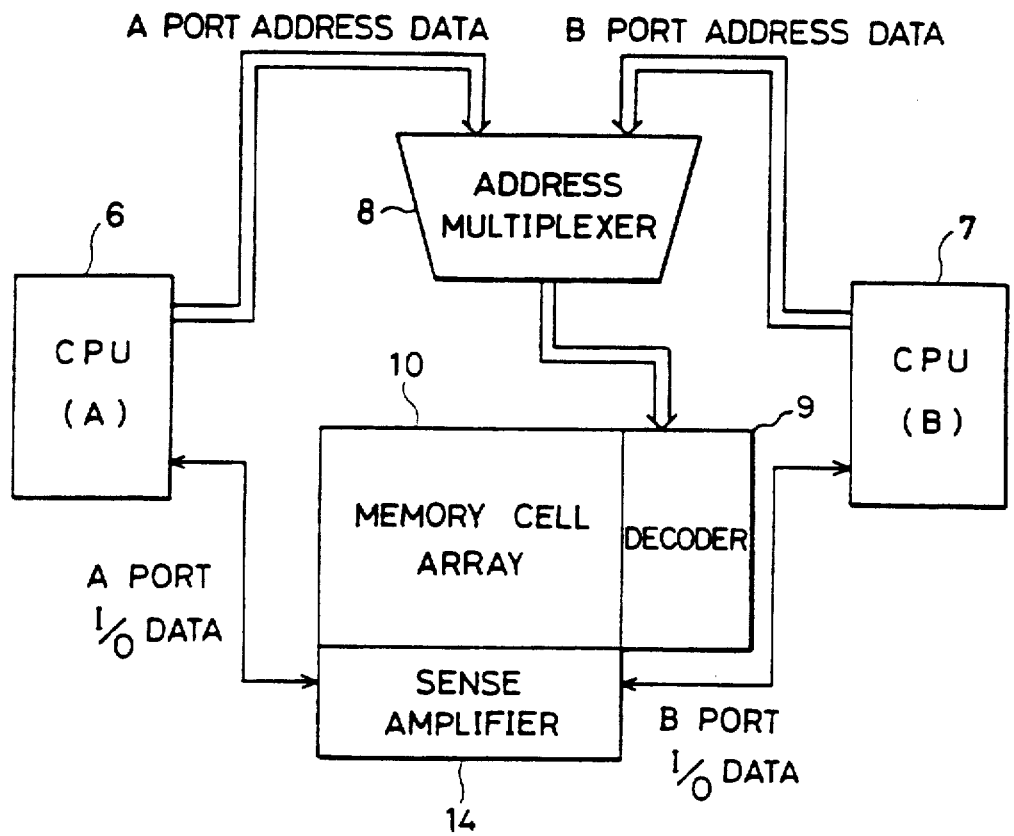
FIG. 2A is a block diagram showing an example of a conventional dual port memory.
Figure 2B:
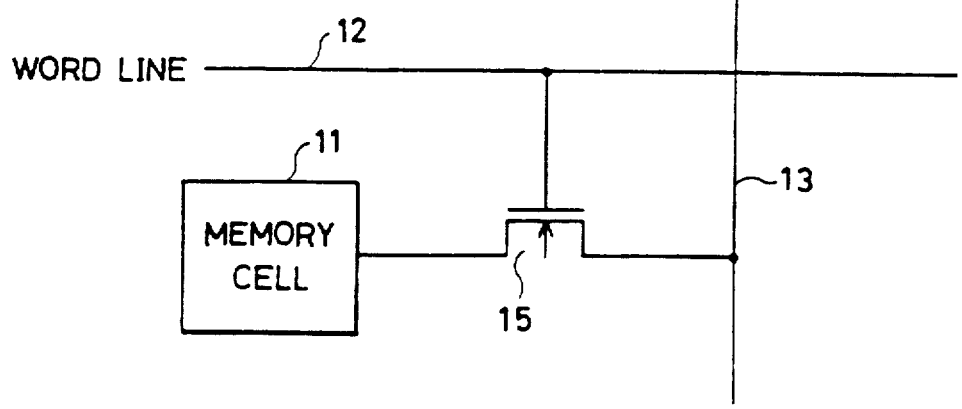
FIG. 2B is a diagram showing a partial structure of the memory cell array of FIG. 2A.
Figure 3A:
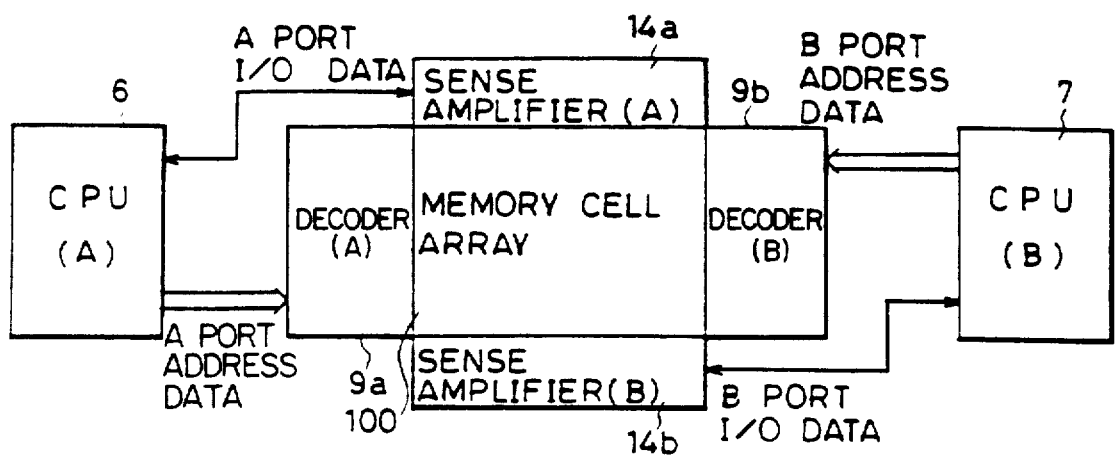
FIG. 3A is a block diagram showing another example of a conventional dual port memory.
Figure 3B:
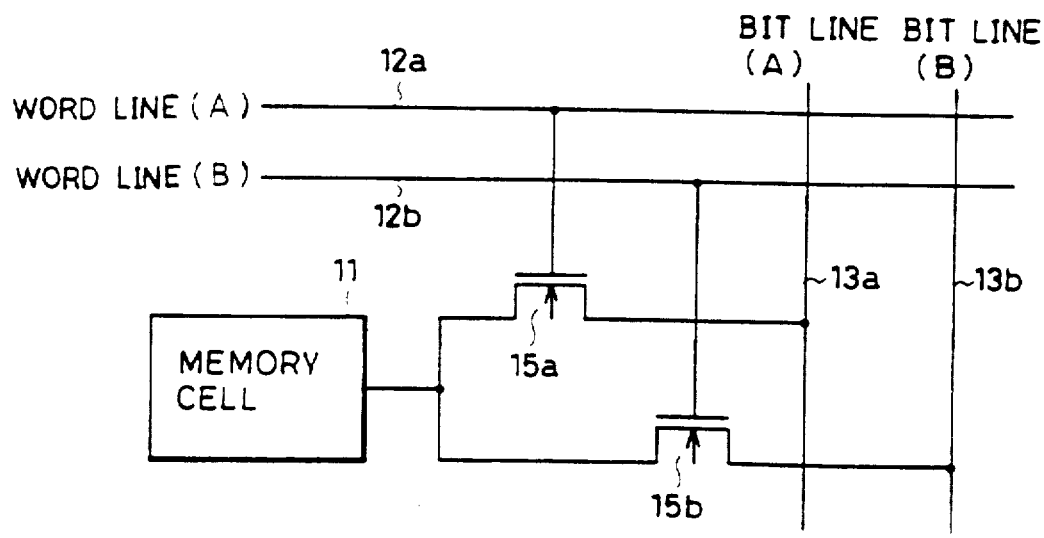
FIG. 3B is a diagram showing a partial structure of the memory cell array of FIG. 3A.
Figures 4, 5:
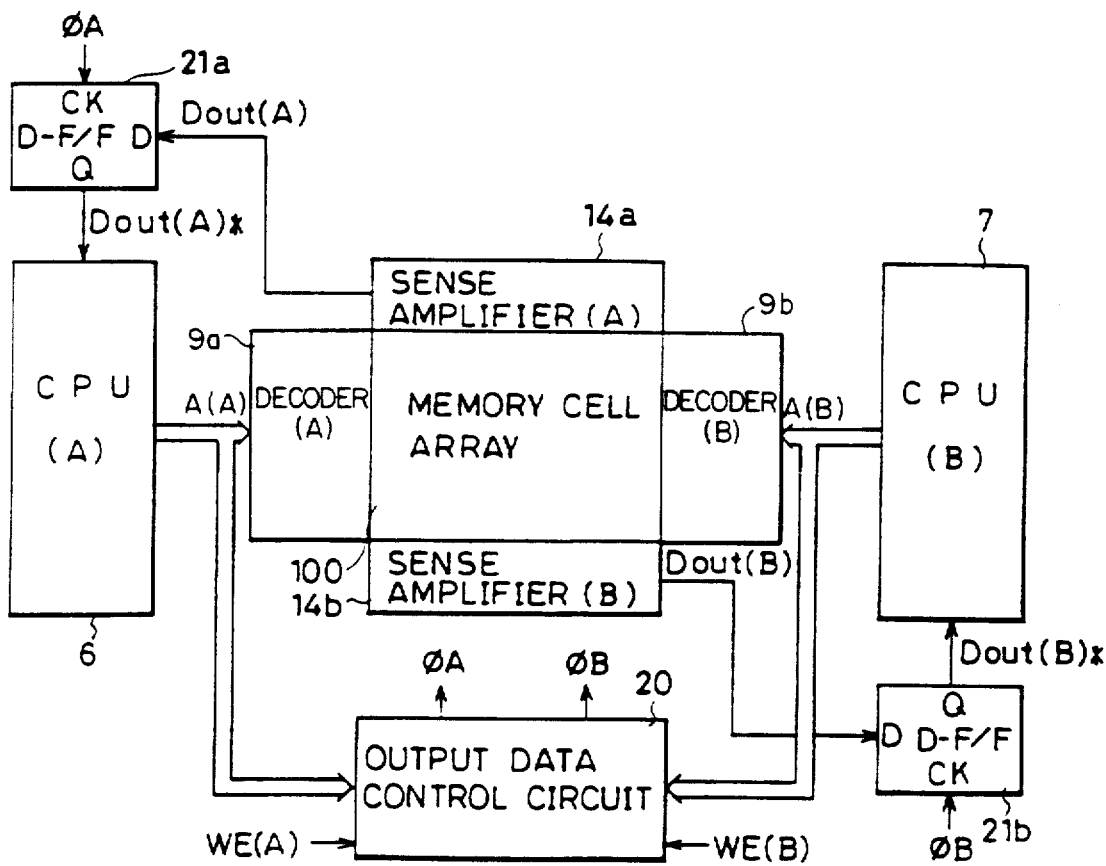
FIG. 4 is a diagram showing the states of the read data and the write data when access contention occurs in the conventional dual port memory of FIG. 3A.
FIG. 5 is a block diagram showing an example of a conventional dual port memory incorporating an access contenting arbitrating circuit.
Figure 6:
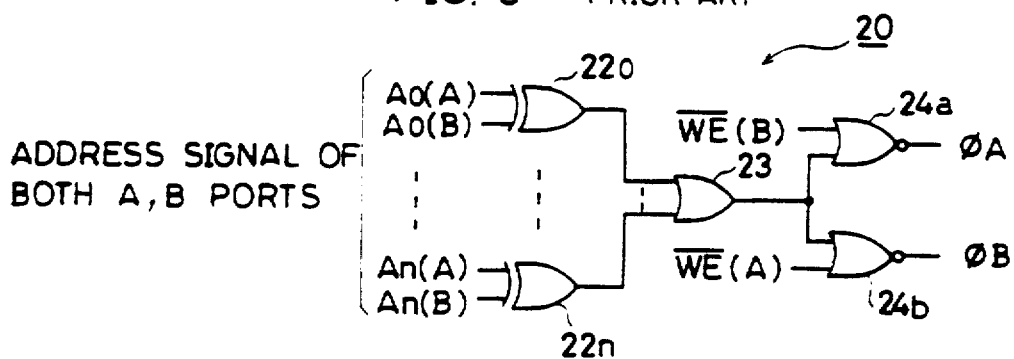
FIG. 6 is a logical gate diagram showing a detail structure of the output data control circuit of FIG. 5.
Figure 7:
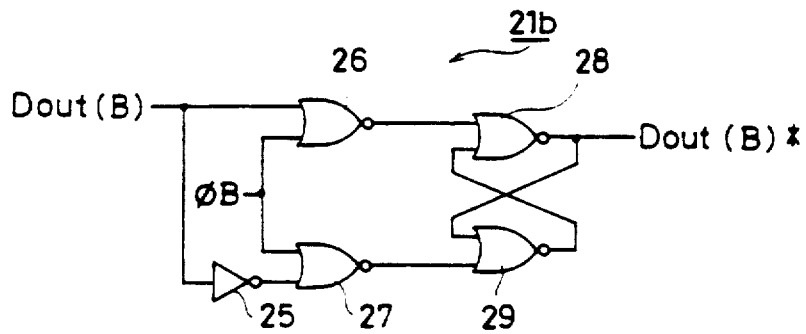
FIG. 7 is a logical gate diagram showing a detail structure of a D type flipflop 21b of FIG. 5.
Figure 8:
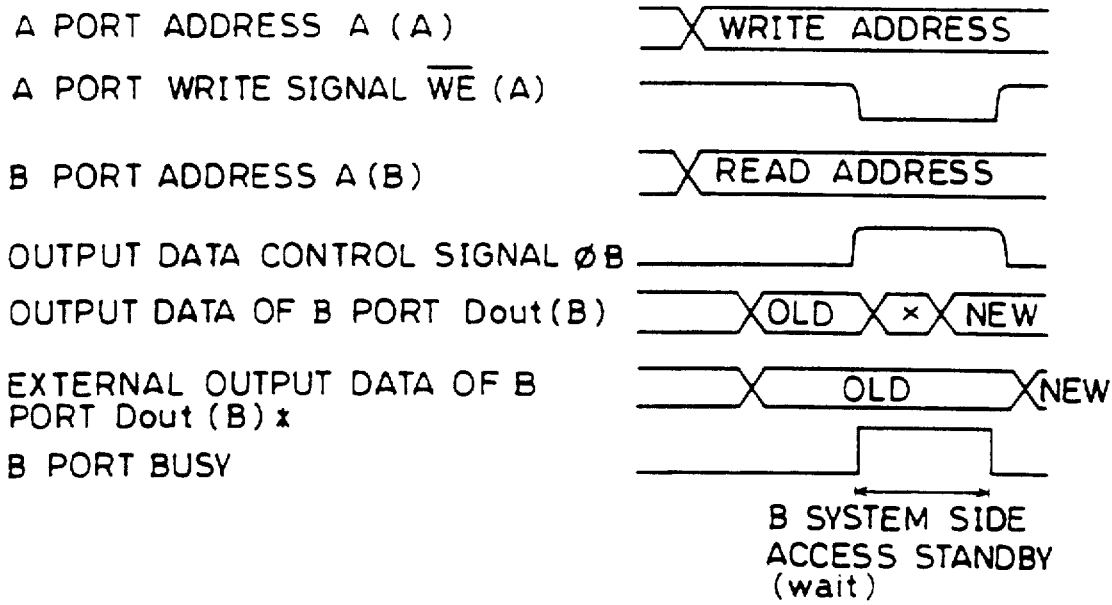
FIG. 8 is a timing chart for describing the operation at the time of access contention of the conventional dual port memory of FIG. 5.
Figure 9:
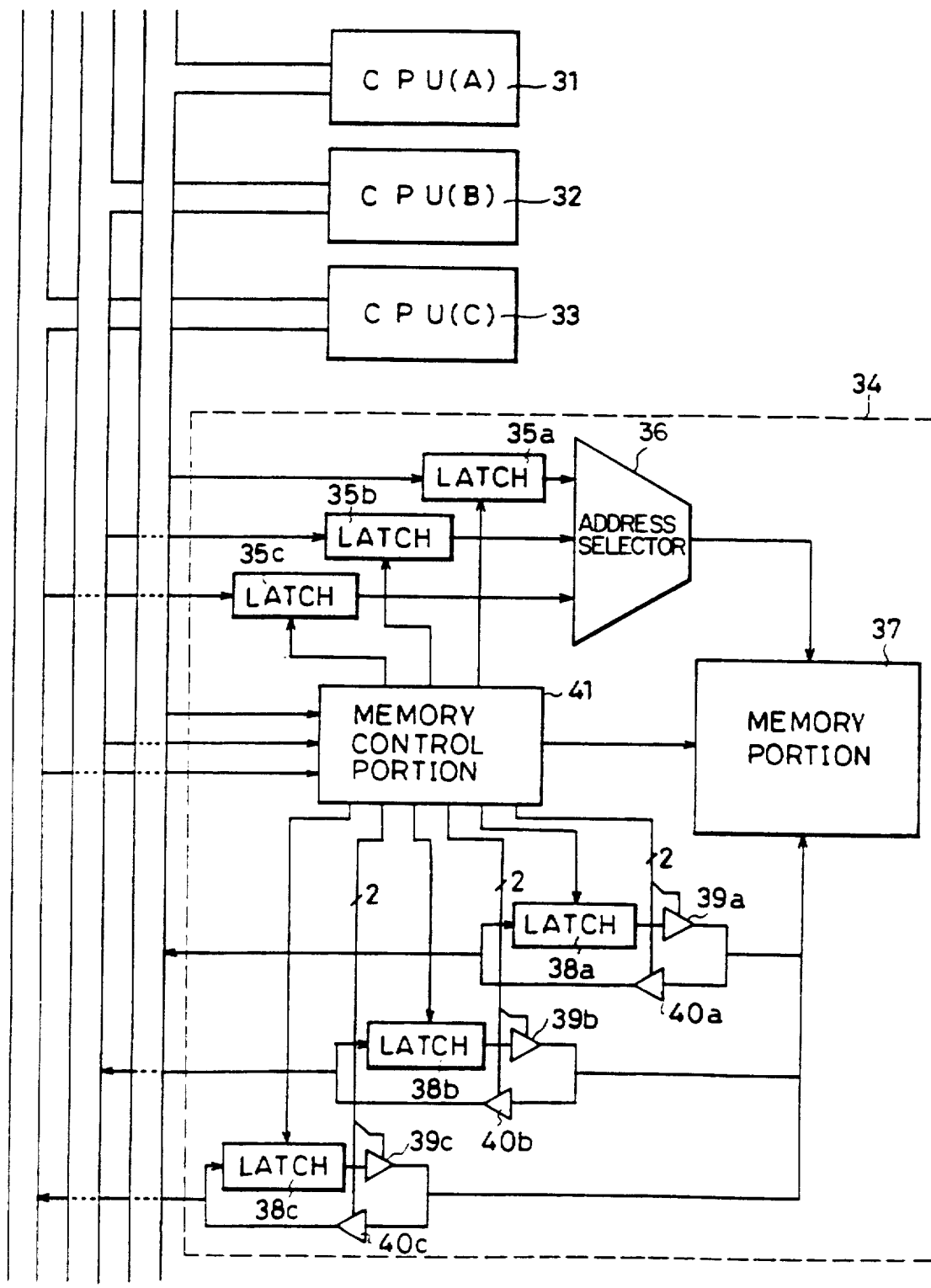
FIG. 9 is a block diagram showing the structure of a conventional multiport memory incorporating an access contention arbitrating circuit.
Figure 10:
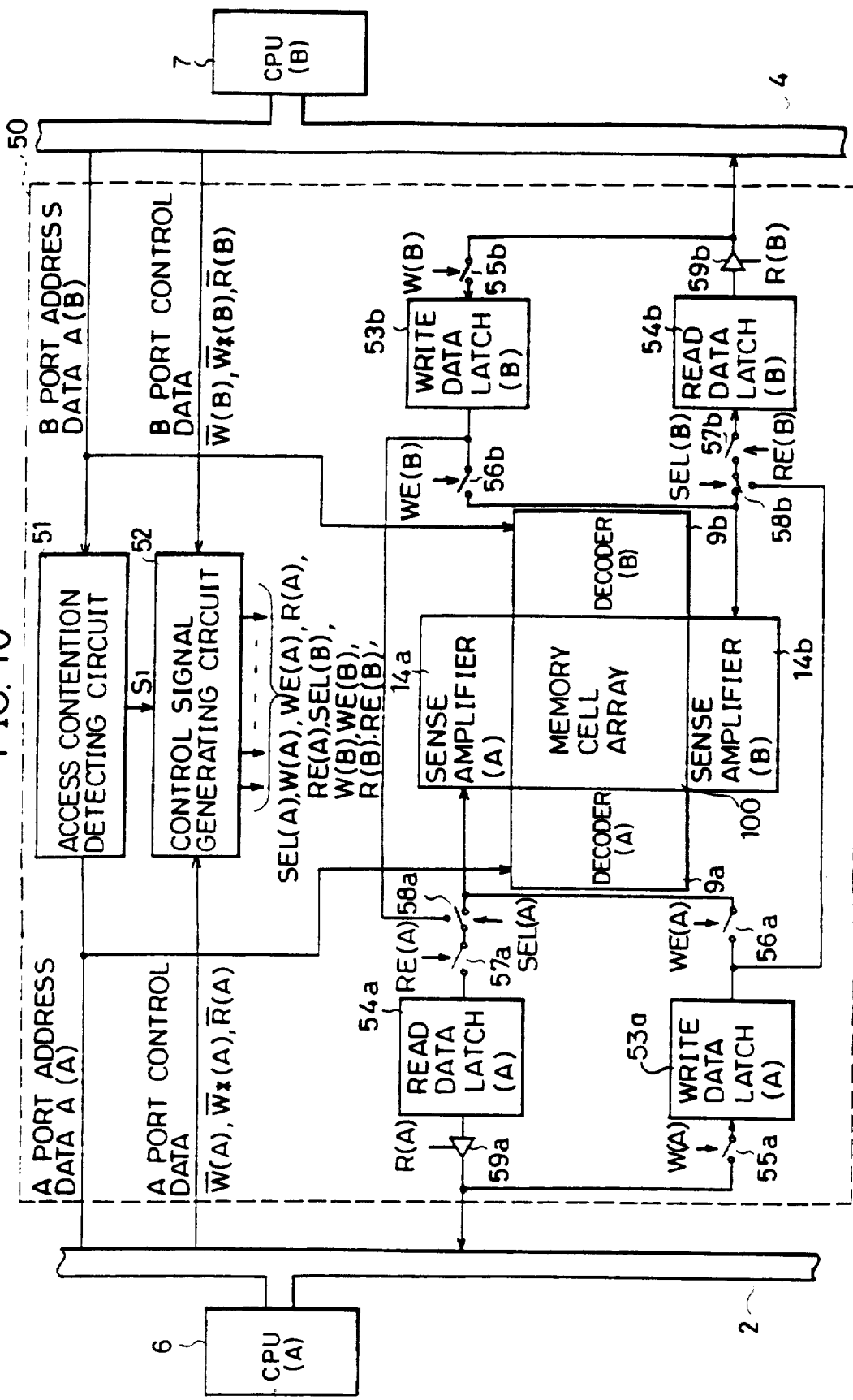
FIG. 10 is a block diagram of a structure of an embodiment of the present invention.

FIG. 10 is a block diagram showing the structure of a dual port RAM in accordance with one embodiment of the invention. A dual port RAM 50 comprises a memory cell 100, decoders 9a and 9b, and sense amplifiers 14a, 14b. Memory cell array 100, decoders 9a and 9b, and sense amplifiers 14a and 14b have structures similar to those shown in FIGS. 3A and 3B.

The dual port RAM 50 also comprises an access contention detecting circuit 51 and a control signal generating circuit 52. The access contention detecting circuit 51 receives A port address data A (A) from CPU 6 of A system and B port address data A (B) from CPU 7 of B system, and makes determination as to whether access contention occurs between A system and B system. The control signal generating circuit 52 generates a control signal for A port and a control signal for B port, in accordance with an access contention detection signal S1 applied from access contention detecting circuit 51, A port control data applied from CPU 6, and B port control data applied from CPU 7. A port control data includes write control signal $\overline{W}$ (A), write operation allowable period defining signal $\overline{W}$ * (A), and read control signal $\overline{R}$ (A). B port control data includes write control signal $\overline{W}$ (B), write operation allowable period defining signal $\overline{W}$ * (B), and read control signal $\overline{R}$ (A). The control signal for A port generated at control signal generating circuit 52 includes switching control signal SEL (A), external write cycle defining signal W (A), internal write cycle defining signal $\overline{WE}$ (A), read data output control signal R (A), and read data fetching control signal RE (A). The control signal for B port includes switching control signal SEL (B), external write cycle defining signal W (B), internal write cycle defining signal WE (B), read data output control signal R (B), and read data fetching control signal RE (B).

The dual port RAM 50 further comprises write data latches 53a, 53b, and read data latches 54a, 54b. The write data latch 53a holds write data of the A port side, while write data latch 53b holds write data of the B port side. The read data latch 54a holds the read data of the A port side, while read data latch 54b holds read data of the B port side.

The dual port RAM 50 also comprises switches 55a-57a, 55b-57b, selecting switches 58a, 58b, and tri-state buffers 59a, 59b. Switches 55a-57a, 55b-57b are each formed of a transistor device, for example. Select switches 58a, 58b are connected in parallel, for example, and are formed of two transistor devices operating complementary to each other. Switch 55a is interposed between a system bus 2 and write data latch 53a, whereas switch 55b is interposed between a system bus 4 and write data latch 53b. These switches 55a, 55b are ON/OFF controlled by external write cycle defining signals W (A), W (B) respectively. Switch 56a is interposed between write data latch 53a and sense amplifier 14a, whereas switch 56b is interposed between write data latch 53b and sense amplifier 14b. The switches 56a, 56b are ON/OFF type switches controlled by internal write cycle defining signal WE (A), WE (B), respectively. Select switch 58a selects either the output of sense amplifier 14a or the output of write data latch 53b, and applies the selected output signal to read data latch 54a. Select switch 58b selects either the output of sense simplifier 14b or the output of write data latch 53a, and applies the selected output signal to read data latch 54b. The switching of select switches 58a, 58b are controlled by switching control signals SEL (A), SEL (B), respectively. Switch 57a is interposed between select switch 58a and read data latch 54a, while switch 57b is interposed between select switch 58b and read data latch 54b. The switches 57a, 57b are ON/OFF controlled by read data fetching control signals RE (A), RE (B), respectively. The tri-state buffer 59a is interposed between read data latch 54a and system bus 2. The tri-state buffer 59b is interposed between read data latch 54b and system bus 4. The conduction/non-conduction of tri-state buffers 59a, 59b are controlled by read data output control signals R (A), R (B), respectively. System bus 2 is connected to CPU 6 of the A system side, whereas system bus 4 is connected to CPU 7 of the B system side.

Figure 11:
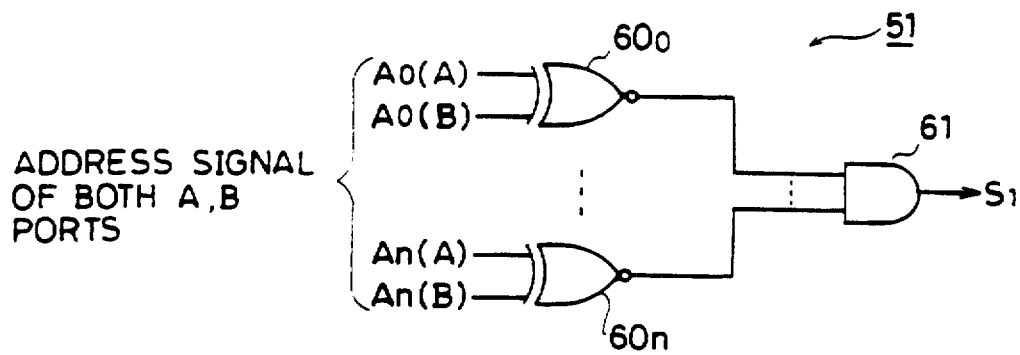
FIG. 11 is a logical circuit diagram showing a detail structure of the access contention detecting circuit of FIG. 10.

FIG. 11 is a logical gate diagram showing the detailed structure of the access contention detecting circuit 51 of FIG. 10. The access contention detecting circuit 51 comprises exclusive NOR gates $60_0$-$60_n$ and AND gate 61. Exclusive NOR gates $60_0$-$60_n$ detects whether the logic of each of address signals A0 (A)-An (A) included in A port address data A (A) coincides with the logic of each of address signals A0 (B)-An (B) included in B port address data A (B). AND gate 61 detects whether or not A port address data A (A) coincides with B port address data A (B) as a whole, by taking the logical product of the outputs of exclusive NOR gates $61_0$-$60_n$. AND gate 61 provides a signal of the H level only when A port address data A (A) completely coincides with B port address data A (B).

The control signal generating circuit 52 of FIG. 10 comprises a read operation control circuit to generate control signals for controlling the read operation of A port and B port, and a read operation control circuit to generate control signals for controlling the write operation of A port and B port.

Figure 12B:
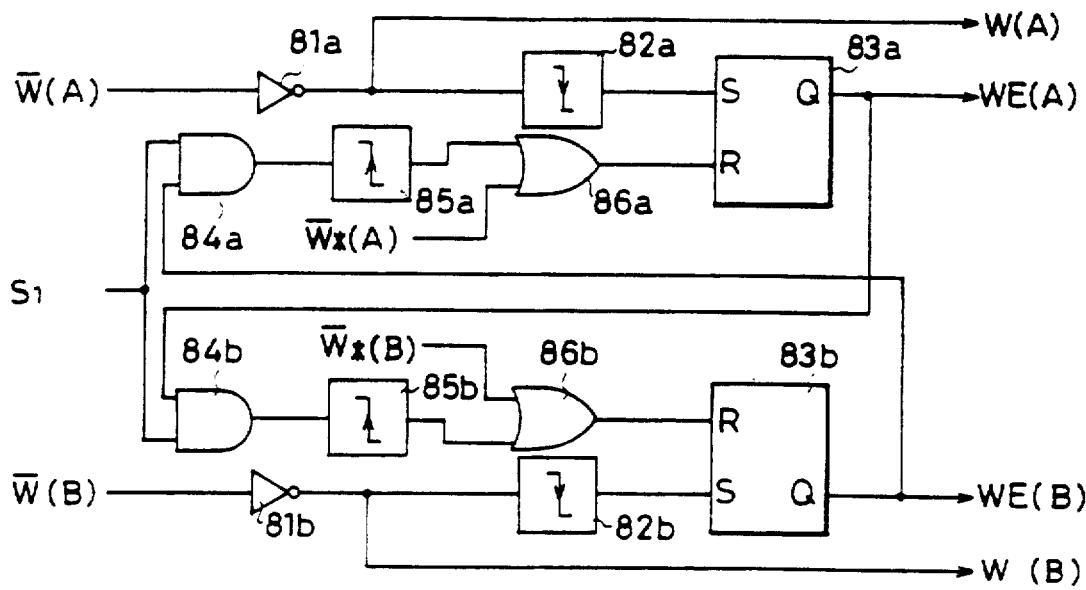
FIG. 12B is a circuit diagram showing an example of the structure of the write operation control circuit included in the control signal generating circuit of FIG. 10.
Figure 12C:
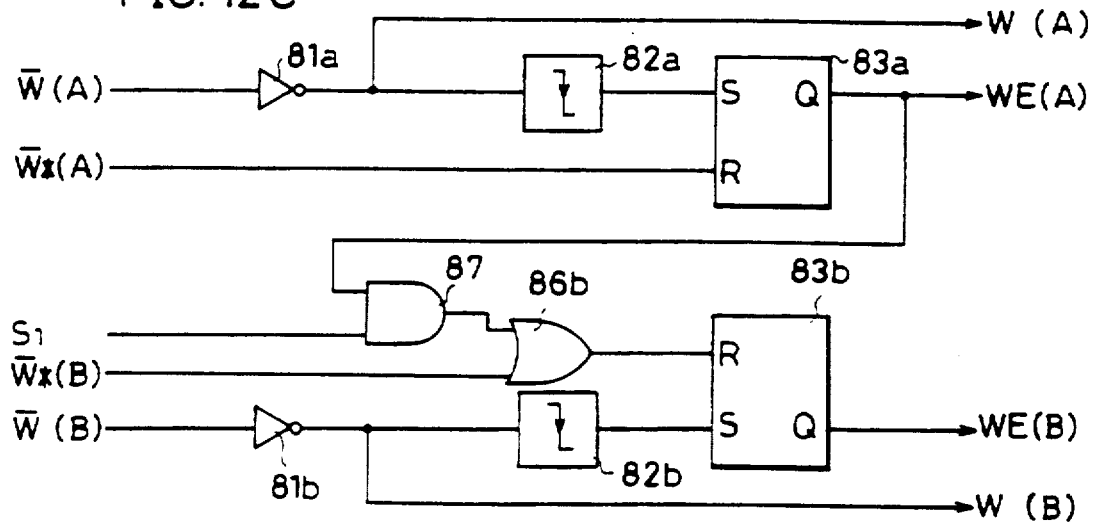
FIG. 12C is a circuit diagram showing another example of the structure of the write operation control circuit included in the control signal generating circuit of FIG. 10.
Figure 12A:
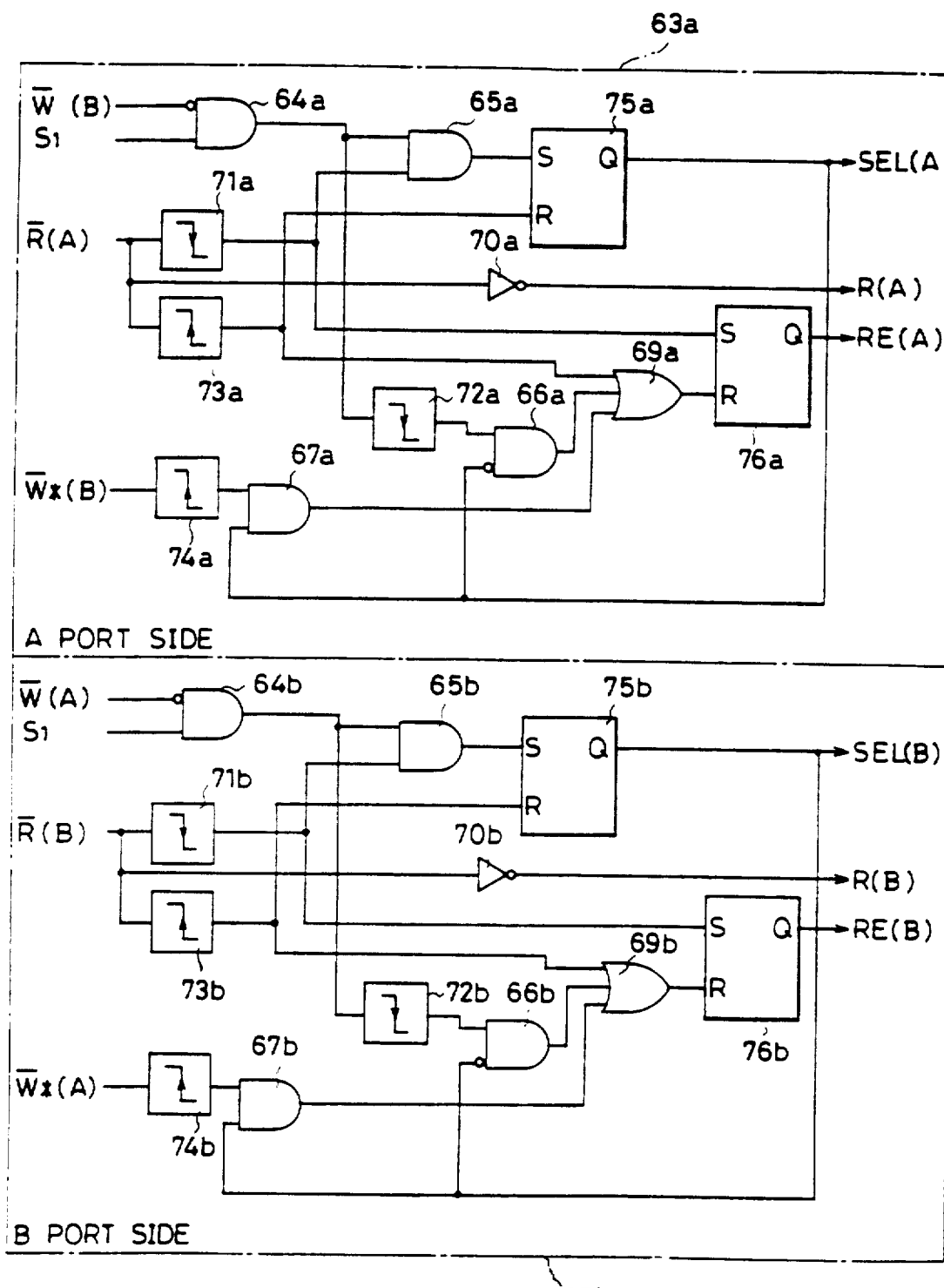
FIG. 12A is a circuit diagram showing the detail structure of the read operation control circuit included in the control signal generating circuit of FIG. 10.

FIG. 12A is a block diagram showing the configuration of the above mentioned read operation control circuit included in the control signal generating circuit 52. The read operation control circuit includes a read operation control circuit 63a of the A port side and a read operation control circuit 63b of the B port side. The read operation control circuit 63a of the A port side and the read operation control circuit 63b of the B port side have like structures, as shown in the figure. Only the applied signal and the generating signal differ, and the circuit structure is the same. Therefore, the corresponding portions are denoted by the same reference numbers, with the suffix "a" added to the end of the reference number for the circuit of the A port side, and the suffix "b" added to the end of the reference number for the circuit of the B port side. The structure of the read operation control circuit 63a of the A port side will be described hereinafter.

The read operation control circuit 63a of the A port side of FIG. 12A is implemented by AND gates 64a-67a, an OR gate 69a, an inverter 70a, falling detecting circuits 71a, 72a for detecting the fall of the input signal, rise detecting circuits 73a, 74a for detecting the rise of the input signal, and RS flipflops 75a, 76a with set input priority. The falling detecting circuit 71a, 72a will output the H level one shot pulse in response to the fall of the input signal, and is formed of a one shot multivibrator operable in response to a fall, for example. The rise detecting circuit 73a, 74a will output the H level one shot pulse in response to the rise of the input signal, and is formed of a one shot multivibrator operable in response to a rise, for example. AND gate 64a receives an inverted signal of write control signal $\overline{W}$ (B) at one input end thereof and receives an access contention detect on signal S1 from access contention detecting circuit 51 at the other input end thereof. The output of AND gate 64a is applied to one input end of AND gate 65a, as well as falling detecting circuit 72a. The output of AND gate 65a is applied to the set input terminal of RS flipflop 75a. The output of falling detecting circuit 72a is applied to one input end of AND gate 66a. Read control signal e,ovs/R/ (A) is applied to falling detecting circuit 71a, rise detecting circuit 73a, and inverter 70a. The output of falling detecting circuit 71a is applied to the other input end of AND gate 65a, as well as to the set input end of RS flipflop 76a. The output of rise detecting circuit 73a is applied to the reset input end of RS flipflop 75a, as well as to the first input end of OR gate 69a. The output of inverter 70a is provided as read data output control signal R (A). Write operation allowable period defining signal $\overline{W}$ * (B) is applied to rise detecting circuit 74a. The output of rise detecting circuit 74a is applied to one input end of AND gate 67a. The Q output of RS flipflop 75a is provided as switching control signal SEL (A), and applied to the other input end of AND gate 67a. The Q output of RS flipflop 75a is inverted and the inverted output is applied to the other input end of AND gate 66a. The output of AND gate 66a is applied to the second input end of OR gate 69a. The output of AND gate 67a is applied to the third input end of OR gate 69a. The output of OR gate 69a is applied to the reset input end of RS flipflop 76a. The Q output or RS flipflop 76a is provided as read data fetching control signal RE (A).

Regarding the aforementioned write operation control circuit included in the control signal generating circuit 52 of FIG. 10, examples of two circuits will be described in this specification. That is to say, they are the write operation control circuit shown in FIG. 12B and the write operation control circuit shown in FIG. 12C. The write operation control circuit of FIG. 12B is the type in which a later generated write access is given priority, when contention occurs between write access of the A port side and write access of the B port side. The write operation control circuit of FIG. 12C is the type in which the access of a predetermined side is always given priority (in FIG. 12C, the write access of A port side), when contention between write access of the A port side and write access of the B port side occurs.

The structure of the write operation control circuit of FIG. 12B is described. Write control signals $\overline{W}$ (A), $\overline{W}$ (B) are applied to inverters 81a, 81b, respectively. The outputs of inverters 81a, 81b are provided as external write cycle defining signals W (A), W (B), respectively. The outputs of inverters 81a, 81b are applied to falling detecting circuits 82a, 82b, respectively. The falling detecting circuits 82a, 82b will output the H level one shot pulse in response to the fall of the input signal, and is formed of a one shot multivibrator responsive to fall, for example. The output of falling detecting circuit 82a is applied to the set input end of RS flipflop 83a having set input priority. The output of falling detecting circuit 82b is applied to the set input end of RS flipflop 83b having reset input priority. The access contention detection signal S1 from access contention detecting circuit 51 is applied to each one input end of AND gates 84a, 84b. The Q output of RS flipflop 83b is applied to the other input end of AND gate 84a. The Q output of RS flipflop 83a is applied to the other input end of AND gate 84b. The outputs of AND gates 84a, 84b are applied to rise detecting circuits 85a, 85b, respectively. The rise detecting circuit 85a, 85b will output the H level one shot pulse in response to the rise of the input signal, and is formed by a one shot multivibrator responsive to a rise, for example. The outputs of rise detecting circuits 85a, 85b are applied to one input ends of OR gates 86a, 86b. Read operation allowable period defining signals $\overline{W}$ * (A), $\overline{W}$ * (B) are applied to the other input ends of OR gates 86a, 86b. The outputs of OR gates 86a, 86b are applied to each reset input end of RS flipflops 83a, 83b. The Q output of RS flipflop 83a is provided as the internal write cycle defining signal WE (A). The Q output of RS flipflop 83b is applied as the internal write cycle defining signal WE (B).

The structure of the write operation control circuit of FIG. 12 will be explained hereinafter. The write operation control circuit of FIG. 12C comprises inverters 81a, 81b, falling detecting circuits 82a, 82b, RS flipflops 83a, 83b, and OR gate 86b, similar to the write operation control circuit of FIG. 12B. However, write operation allowable period defining signal $\overline{W}$ * (A) is directly applied to the reset input end of RS flipflop 83a. Also, read operation allowable period defining signal $\overline{W}$ * (B) is directly applied to one input end of OR gate 86b. The Q output of RS flipflop 83a is applied to one input end of AND gate 87, while an access contention detection signal S1 from access contention detecting circuit 51 is applied to the other input end of AND gate 87.

Figure 13:
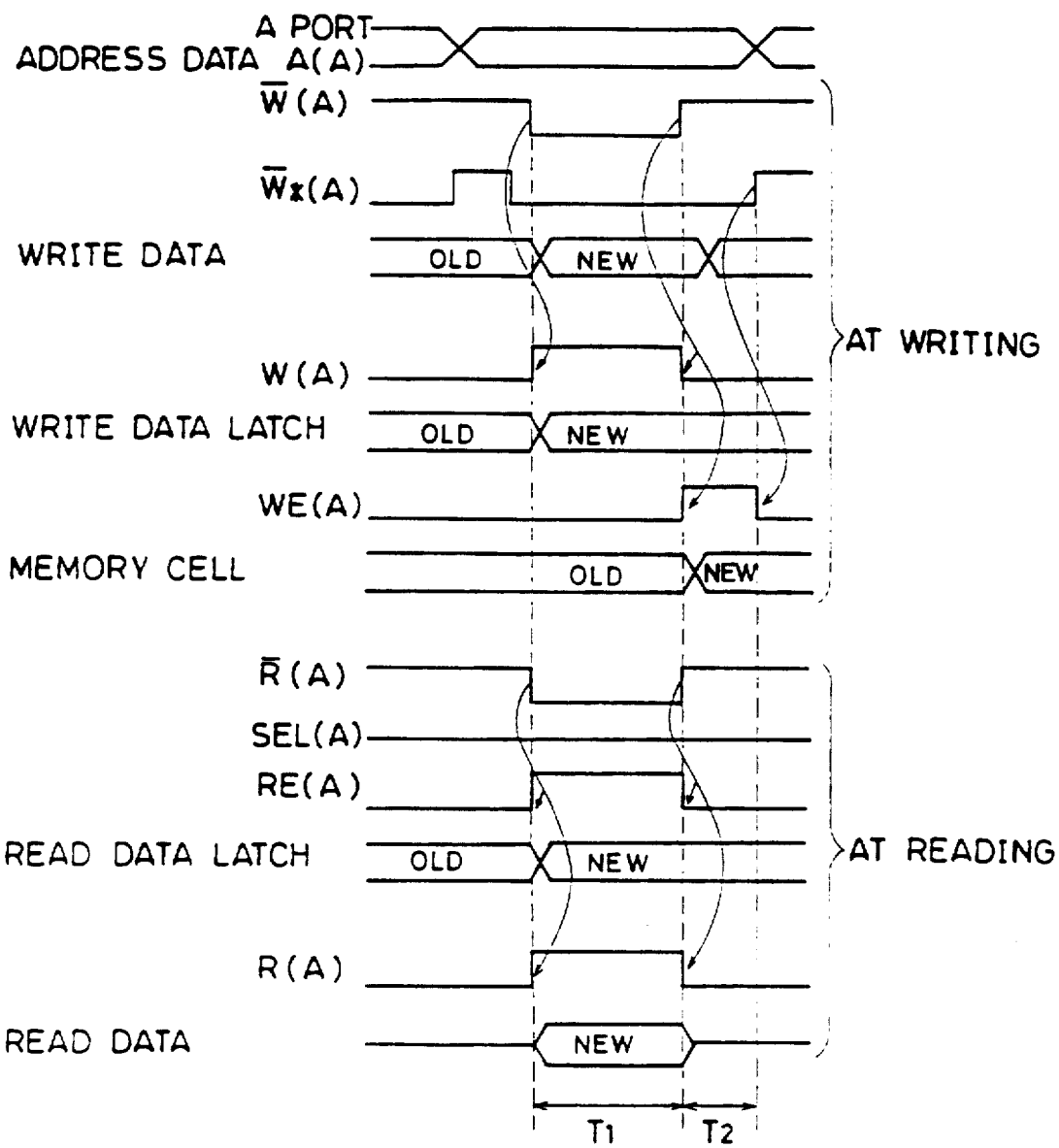
FIG. 13 is a timing chart for describing the basic read/write operation of the embodiment of FIG. 10.

FIG. 13 is a timing chart for explaining the general operation of the embodiment shown in FIGS. 10-12C. In reference to FIG. 13, the write/read operation of the A port side in the case of no access contention will be described. It is to be appreciated that the write/read operation of the B port side is the same.

The general write operation of the A port side will be first described. During writing, dual port RAM 50 receives A port address data A (A) from CPU 6, write control signal $\overline{W}$ (A), write operation allowable period defining signal $\overline{W}$ * (A), and write data via system bus 2. In general memory devices, write data is written into a memory cell during the period when write control signal $\overline{W}$ (A) is at the L level. However, in the dual port RAM 50 of FIG. 10, the L level period of write control signal $\overline{W}$ (A) is allotted for the fetching period of the write data, so that the practical writing into a memory cell is performed within a predetermined period following the fetching period of the write data. Write operation allowable period defining signal $\overline{W}$ * (A) is used for this purpose. This write operation allowable period defining signal $\overline{W}$ * (A) is a signal with a pulse wider than that of the write control signal $\overline{W}$ (A). The period from the rise of write control signal $\overline{W}$ (A) to the rise of write operation allowable period defining signal $\overline{W}$ * (A) is allotted for the write period of the data into a memory cell. During this period, writing data into the selected memory cell is possible because A port address data A (A) is still applied. Such a write operation allowance period defining signal $\overline{W}$ * (A) is externally generated using a system clock signal for example. A timing signal such as an address latch enable signal may be also used as the write operation allowable period defining signal $\overline{W}$ * (A). External write cycle defining signal W (A) which is the inverted signal of write control signal $\overline{W}$ (A) is brought to the H level during the period when write control signal $\overline{W}$ (A) is at the L level. When external write cycle defining signal W (A) is at the H level, switch 55a is turned on, so the write data from CPU 6 is fetched and held in write data latch 53a. Since the period when write control signal $\overline{W}$ (A) is at the L level (i.e. when external write cycle defining signal W (A) is at the H level) is the write cycle when viewed from the CPU 6 side, this time period is referred to as the external write cycle hereinafter. Internal write cycle defining signal WE (A) is at the H level during the period from the rise of write control signal $\overline{W}$ (A) to the rise of write operation allowable period defining signal $\overline{W}$ * (A). This is because RS flipflop 83a of FIGS. 12B and 12C is set (Q output is turned to the H level) in response to the rise of write control signal $\overline{W}$ (A), and reset (Q output is turned to the L level) in response to the rise of write operation allowable period defining signal $\overline{W}$ * (A). If internal write cycle defining signal WE (A) is at the H level, switch 56a is turned on to apply the write data held in write data latch 53a to sense amplifier 14a. This data is written into the select memory cell of memory cell array 100. Thus, the period of the H level of internal write cycle defining signal $\overline{WE}$ (A) is the actual write cycle into a memory cell, in the internal of dual port RAM 50. Therefore, the period when internal write cycle defining signal WE (A) is at the H level is referred to as the internal write cycle hereinafter.

The general read operation of the A port side will be described. During read, dual port RAM 50 receives A port address data A (A) and read control signal $\overline{R}$ (A) from CPU 6 via system bus 2. Since access contention does not exist at this time, the access contention detection signal S1 from access contention detecting circuit 51 is at the L level. Therefore, the output of AND gate 64a in the read operation control circuit 63a of FIG. 12A is at the L level. Consequently, even if read control signal $\overline{R}$ (A) falls and an H level one shot pulse is provided from falling detecting circuit 71a, this one shot pulse can not pass AND gate 65a. RS flipflop 75a is not set, and the Q output thereof, i.e. the switching control signal SEL (A), is held at the L level. In response, select switch 58a selects the output of sense amplifier 14a. Also, RS flipflop 76a is set in response to the fall of read control signal $\overline{R}$ (A). Accordingly, the Q output of RS flipflop 76a, i.e. the read data fetching control signal RE (A) is at the H level during the period when read control signal $\overline{R}$ (A) is at the L level. When read data fetching control signal RE (A) is at the H level, switch 57a is turned on to apply the output of sense amplifier 14a to read data latch 54a via switch 57a. Therefore, read data latch 54a holds the output of sense amplifier 14a, i.e., the data read out from the selected memory cell of array 100. Furthermore, since read data output control signal R (A) is the inverted signal of read control signal $\overline{R}$ (A), read data output control signal R (A) is at the H level during the period when read control signal $\overline{R}$ (A) is at the L level. When read data output control signal R (A) is at the level, tri-state buffer 59a is turned to a conductive state to output the read data held in read data latch 54a to CPU 6 via system bus 2. Similar to the aforementioned write operation, the read cycle viewed from CPU 6 (defined by the L level period of read control signal $\overline{R}$ (A)) will be called the external read cycle, and the read cycle internal of dual port RAM 50 (defined by the H level period of read data fetching control signal RE (A)) will be called the internal read cycle, regarding the read operation. The above described general write/read operation is performed in an identical manner also at the B port side.

Figure 14:
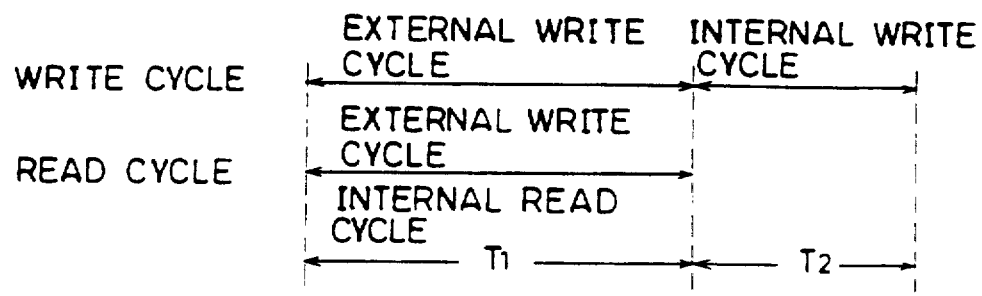
FIG. 14 is a diagram schematically showing the write/read operation of the embodiment of FIG. 10.

It is understood from the aforementioned description that dual port RAM 50 operates as shown in FIG. 14. The entire write operation (write cycle) is divided into the first half of the external write cycle of time period T1, and the later half of the internal write cycle of time period T2. During external write cycle, the fetching of write data from CPU 6 is performed. During the internal write cycle, the actual writing into the selected memory cell is performed. Regarding the read operation, the external read cycle coincides with the internal read cycle. In other words, the read instruction from the CPU is performed in real-time with the read operation from the memory cell.

Figure 15:
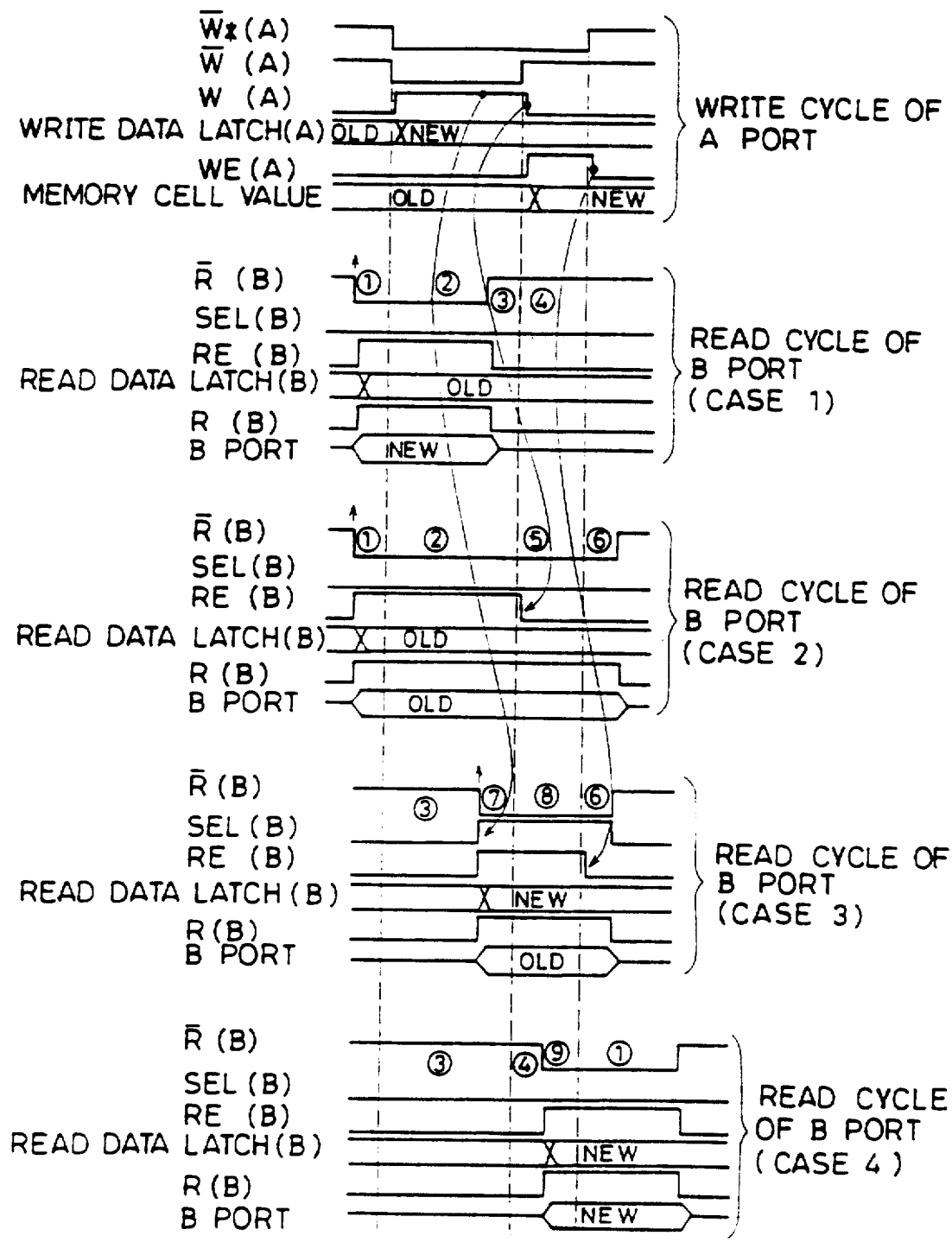
FIG. 15 is a timing chart for explaining the operation when contention occurs between write access of the A port side and the read access of the B port side in the embodiment of FIG. 10.

FIG. 15 is a timing chart for explaining the operation when contention occurs between write access of the A port side and read access of the B port side with respect to the same memory cell. Referring to FIG. 15, the operation of the embodiment of FIG. 10-12C when the above mentioned access contention occurs will be described. FIG. 15 shows the timing of four cases of access contention. FIG. 16A is given for the purpose of clarification, in which case 1 of (a) shows that the read cycle of B port starts before the internal write cycle of A port, with the read cycle of B port ending during the external write cycle of A port. Case 2 of (b) in FIG. 16A shows that the read cycle of B port starts before the external write cycle of A port and ends after the termination of the internal write cycle of A port. Case 3 of (c) in FIG. 16A shows that the read cycle of B port starts during the external write cycle of A port and ends after the termination of the internal write cycle of B port. Case 4 of (d) in FIG. 16A shows that the read cycle of B port commences during the internal write cycle of A port and ends after the termination of the said internal write cycle The operation of cases 1-4 will be described hereinafter. The flow of data in A port and B port of Cases 1-4 is shown in FIGS. 16B-16E.

(1) Operation of Case 1

When the read cycle of B port is started by read control signal $\overline{R}$ (B) falling to the L level, read data output control signal R (B) that is the inverted signal of read control signal $\overline{R}$ (B), rises to the H level. Also, in the read operation control circuit 63b of the B port side (refer to FIG. 12A), an H level one shot pulse is outputted from falling detecting circuit 71b, and RS flipflop 76b is set. This causes read data fetching control signal RE (B) to rise to the H level. Since access contention does not exist at this time, the access contention detection signal S1 from access contention detecting circuit 51 is at the L level. Write control signal $\overline{W}$ (A) is at the H level. Therefore, the output of AND gate 64b is at the L level. Consequently, even when an H level one shot pulse is outputted from falling detecting circuit 71b in response to the fall of read control signal $\overline{R}$ (B), this one shot pulse can not pass through AND gate 65b. As a result, RS flipflop 75b is not set, and switching control signal SEL (B) remains at the L level. Since read data output control signal R (B) is at the H level, tri-state buffer 59b is conductive. Also, switch 57b is ON, because read data fetching control signal RE (B) is at the H level. Furthermore, select switch 58b selects the output of sense amplifier 14b since switching control signal SEL (B) is at the L level. Accordingly, the operation state of dual port RAM 50 at this time is that as shown in FIG. 17A. In other words, no operation is performed at the A port side, because the write cycle has not yet started. Meanwhile at the B port side, the read data output from sense amplifier 14b is provided to system bus 4 via read data latch 54b.

Next when write control signal $\overline{W}$ (A) and write operation allowable period defining signal $\overline{W}$ * (A) fall to the L level, external write cycle defining signal W (A) which is the inverted signal of write control signal $\overline{W}$ (A) rises to the H level, and the external write cycle of A port is commenced. In the write operation control circuit of FIGS. 12B and 12C at that time, one shot pulse is not provided from falling detecting circuit 82a, and RS flipflop 83a remains at a reset state. Therefore, the internal write cycle defining signal WE (A) is at the L level. Meanwhile, there is no change in the operation state in the read operation control circuit 63b of the B port side. Therefore, read data output control signal R (B), read data fetching control signal RE (B) remains at the H level, while switching control signal SEL (B) remains at the L level. Because external write cycle defining signal W (A) is at the H level, switch 55a is newly turned to an ON state at the A port side. Therefore, the operation state of dual port RAM 50 at this time is the state of ② shown in FIG. 17B. That is to say, the write data from CPU 6 is applied and held at write data latch 53a at the A port side. Meanwhile, there is no change in the operation state of the B port side, and the read data output from sense amplifier 14b is provided to system bus 4 via read data latch 54b.

Next, when read control signal $\overline{R}$ (B) rises and the read cycle of B port terminates, read data output control signal R (B), which is an inverted signal of read control signal $\overline{R}$ (B), falls. Also, in the read operation control circuit 63b of the B port side, H level one shot pulse is provided from rise detecting circuit 73b in response to the rise of read control signal $\overline{R}$ (B). This one shot pulse passes OR gate 69b to be applied to the reset input end of RS flipflop 76b. This causes RS flipflop 76b to be reset. Accordingly, read data fetching control signal RE (B) falls to the L level. Meanwhile, in the write operation control circuit of FIGS. 12B and 12C, the operation state does not change. Therefore, external write cycle defining signal W (A) maintains the H level, internal write cycle defining signal WE (A) maintains the L level, and switching control signal SEL maintains the L level. Thus, since read data fetching control signal RE (B) and read data output control signal R (B) fall to the L level, switch 55b is turned to an OFF state, and tri-state buffer 59b is turned to a non-conductive state in the B port side. Therefore, the operation state of dual port RAM 50 at this time shows the state of ③ of FIG. 17C. That is to say, the operation at the B port side is halted. Meanwhile, the operation state of the A port side does not change, and write data from CPU 6 is applied and held at write data latch 53a.

Next, when write control signal $\overline{W}$ (A) rises to the H level, and the external write cycle defining signal W (A) which is the inverted signal thereof, falls to the L level, the external write cycle of A port ends. Also, in response to the fall of external write cycle defining signal W (A), an H level one shot pulse is provided from falling detecting circuit 82a in the write operation control circuit of FIGS. 12B and 12C, to set RS flipflop 83a. This causes internal write cycle defining signal WE (A) to rise to the H level, and the internal write cycle of the A port commences. Meanwhile, the operation state of the read operation control circuit 63b of the B port side does not change. Accordingly, read data fetching control signal RE (B), read data output control signal R (B), and switching control signal SEL (B) each maintain the L level. Thus, external write cycle defining signal W (A) falls to the L level, to turn switch 55a off. Also, since internal write cycle defining signal WE (A) rises to the H level, switch 56a is turned on. Thus, the operation state of dual port RAM 50 at this time is the state of ④ shown in FIG. 17D. That is to say, the write data held in write data latch 53a is applied to sense amplifier 14a via switch 56a, and written into selected memory cell of memory cell array 100. Meanwhile, there is no change in the operation state of the B port side, and the operation remains halted.

In the operation of case 1, the write data applied to A port is not immediately written into a memory cell, but first held in write data latch 53a, while the reading and output of data is performed at the B port side during this period. In writing the write data held in write data latch 53a into a memory cell, the output operation of the read data in B port is inhibited so that indefiniteness of read data arising from contention between write access and read access is prevented.

(2) The Operation of Case 2

First, the read cycle of B port commenced by read control signal $\overline{R}$ (B) falls to the L level. At his time, the external write cycle of the A port side has not yet started. Therefore, the operation state of dual port RAM 50 at this time is the state of ① of the aforementioned FIG. 17A. That is to say, the read data output from sense amplifier 14b is provided to system bus 4 via read data latch 54b.

Next, write control signal $\overline{W}$ (A), write operation allowable period defining signal $\overline{W}$ * (A) fall to the L level and the external write cycle of A port commences. B port is in the middle of the read cycle at this time. Therefore, the operation state of dual port RAM 50 at this time is the state of ② shown in the aforementioned FIG. 17B. That is to say, at the A port side, the write data input from CPU 6 is applied and held at write data latch 53a. At the B port side, the read data output from sense amplifier 14b is provided to system bus 3 via read data latch 54b.

Next, when write control signal $\overline{W}$ (A) rises to the H level and external write cycle defining signal W (A) which is the inverted signal thereof falls to the L level, the external write cycle of A port ends. Also, an H level one short pulse is provided from falling detecting circuit 82a in the write operation control circuit of FIGS. 12B and 12C to set RS flipflop 83a, in response to the fall of external write cycle defining signal W (A). This causes internal write cycle defining signal WE (A) to rise to the H level, which starts the internal write cycle of A port. Meanwhile, in the read operation control circuit 63b of the B port side, the output of AND gate 64b falls from the H level to the L level. This is because one input of AND gate 64b is turned to L level, due to the L level of write control signal $\overline{W}$ (A) rising to the H level, despite the access contention detection signal S1 from access contention detecting circuit 51 being the H level. In response to the fall of AND gate 64b, an H level one shot pulse is provided from falling detecting circuit 72b. This one shot pulse is applied to one input end of AND gate 66b. At this time, the inverted signal of switching control signal SEL (B), i.e. a signal of the H level, is applied to the other input end of AND gate 66b. Accordingly, the one shot pulse of falling detecting circuit 72b passes AND gate 66b to be applied to the reset input end of RS flipflop 76b via OR gate 69b. In response, RS flipflop 76b is reset, and read data fetching control signal RW (B) is turned to the L level. The read data output control signal R (B) maintains the H level, and the switching control signal SEL (B) maintains the L level. Thus, switch 55a is turned to an OFF state because external write cycle defining signal W (A) is brought to the L level. Also, switch 56a is turned on because internal write cycle defining signal WE (A) is brought to the H level. Furthermore, switch 57b is turned off because read data fetching control signal RE (B) is brought to the L level. Therefore, the operation state of dual port RAM 50 at this time is the state of ⑤ shown in FIG. 17E. That is to say, at the A port side, the write data held in write data latch 53a is applied the selected memory cell. Meanwhile, at the B port side, the read data held in read data latch 54b is provided to system bus 4 via tri-state buffer 59b.

Next, when write operation allowable period defining signal $\overline{W}$ * (A) rises to the H level, RS flipflop 83a in the write operation control circuit shown in FIGS. 12B and 12C is reset and the internal write cycle defining signal WE (A) falls to the L level to end the internal write cycle of A port. Meanwhile, in the read operation control circuit 63b of the B port side, there is no change in the operation state. Therefore, switching control signal SEL (B), and read data fetching control signal RE (B) maintain the L level, whereas read data output control signal R (B) maintains the H level. Thus, switch 56a is turned off because internal write cycle defining signal WE (A) is brought to the L level. Therefore, the operation state of dual port RAM 50 at this time is the state of ⑥ shown in FIG. 17F. That is to say, the operation at the A port side is completely halted. Meanwhile, there is no change in the operation state of the B port side, and the read data held in read data latch 54b is provided to system bus 4 via tri-state buffer 59b.

Thus, in case 2, indefiniteness of read data arising from contention between write access and read access is prevented, by providing the read data held in read data latch 54b at the time of the start of the read cycle to system bus 4, even during the write cycle of A port.

(3) The Operation of Case 3

First, write control signal $\overline{W}$ (A), write operation allowable period defining signal $\overline{W}$ * (A) each falls to the L level. In response, the external write cycle defining signal W (A) which is the inverted signal of write control signal $\overline{W}$ (A) rises to start the external write cycle of A port. At this time, the read cycle of B port has not yet started. This state is similar to the state of the aforementioned case 1 where the read cycle of B port terminates during the external write cycle of A port. Therefore, the operation state of dual port RAM 50 at this time is the state of ③ shown in the aforementioned FIG. 17C. That is to say, the write data input from CPU 6 is applied and held at write data latch 53a via switch 55a at the A port side. Meanwhile, at the B port side, no operation is performed because the read cycle has not yet started.

Next, when read control signal $\overline{R}$ (B) falls to the L level, read data output control signal R (B) which is the inverted signal thereof rises to the H level to start the read cycle of B port. At this time, the two inputs of AND gate 64b in the read operation control circuit 63b of the B port side are both at the H level, and the output of AND gate 64b is at the H level. Consequently, when a one short pulse from falling detecting circuit 71b is provided in response to the fall of read control signal $\overline{R}$ (B), this one shot pulse passes AND gate 65b to set RS flipflop 75b. Therefore, switching control signal SEL (B) rises to the H level. The one shot pulse output from falling detecting circuit 71b also sets RS flipflop 76b. Accordingly, read data fetching control signal RE (B) also rises to the H level. Meanwhile, there is no change is the operation state in the write operation control signal shown in FIGS. 12B and 12C. Therefore, external write cycle defining signal W (A) maintains the H level, and internal write cycle defining signal WE (A) maintains the L level. Thus, select switch 58b selects the output of write data latch 53a because switching control signal SEL (B) turns to the H level. Also, switch 57b is turned on because read data fetching control signal RE (B) is at the H level. Furthermore, tri-state buffer 59 is turned to a conductive state because read data output control signal R (B) is at the H level. Therefore, the operation state of dual port RAM 50 at this time is the state of ⑦ shown in FIG. 17G. That is to say, there is no change in the operation state at the A port side, and the write data input from CPU 6 is applied and held at write data latch 53a via switch 55a. Meanwhile, at the B port side, the data held in write data latch 53a of the A port side is applied and held at read data latch 54b via select switch 58b and switch 57b. The held data of read data latch 54b is provided to system bus 4 as the read data via tri-state buffer 59b. That is to say, the data fetched at the A port side will be output as the read data from B port, before being written into the memory cell.

Next, when write control signal $\overline{W}$ (A) rises to the H level, the external write cycle defining signal W (A) which is the inverted signal thereof falls to the L level, and the external write cycle of A port terminates. Also, in response to the fall of external write cycle defining signal W (A), an H level one shot pulse from falling detecting circuit 82a in the write operation control circuit of FIGS. 12B and 12C is provided to set RS flipflop 83a. Therefore, internal write cycle defining signal WE (A) rises to the H level, to start the internal write cycle of A port. Meanwhile, in the read operation control circuit 63b of the B port side, there is no change in the operation state. Therefore, switching control signal SEL, write data fetching control signal RE (B), and read data output control signal R (B) each maintain the H level. Thus, switch 55a is turned off because external write cycle defining signal W (A) is brought to the L level. Also, switch 56a is turned on because internal write cycle defining signal WE (A) is brought to the H level. Therefore, the operation state of dual port RAM 50 at this time is the state of ⑧ shown in FIG. 17H. That is to say, at the A port side, the input from CPU 6 to write data latch 53a is blocked, and the write data held in write data latch 53a is applied to sense amplifier 14a via switch 56a. Therefore, data is written into the selected memory cell of memory cell array 100. Meanwhile, there is no change in the operation state of B port side, and the data held in write data latch 53a is provided to system bus 4 as the read data via read data latch 54b.

Next, when write operation allowable period defining signal $\overline{W}$ * (A) falls to the L level, RS flipflop 83a in FIGS. 12B and 13C are reset so that internal write cycle defining signal WE (A) falls to the L level. Therefore, the internal write cycle of A port ends. At this time, B port is in the middle of the read cycle. This state is similar to the state in case 2 where the internal write cycle of A port ends. Therefore, the operation state of dual port RAM 50 at this time is the state of ⑥ shown in the aforementioned FIG. 17F. That is to say, at the A port side, no operation is performed because the write cycle has terminated. Meanwhile, in the B port side, the data held in read data latch 54b (the data fetched from write data latch 53a during the write cycle of A port) is provided to system bus 4.

Thus in the case of 3, the data fetched into write data latch 53a in the write cycle of A port is applied to read data latch 54b via select switch 58b, and is provided to system bus 4 as the read data from read data latch 54b. In other words, because the selected memory cell will be overwritten later by the write data from CPU 6, the data held in write data latch 54b will be handled as the read data before the overwrite is performed. This prevents indefiniteness of read data arising from contention between write access of the A port side and the read access of the B port side.

(4) The Operation of Case 4

First, write control signal $\overline{W}$ (A) and write operation allowable period defining signal $\overline{W}$ * (A) each fall to the L level. Therefore, the external write cycle defining signal W (A) which is the inverted signal of write control signal $\overline{W}$ (A) rises to the H level to start the external write cycle of A port. At this time, the read cycle of B port has not yet started. This state is similar to the state in the aforementioned case 3 where the external write cycle of A port commences. Therefore, the operation state of dual port RAM 50 at this time is the state of ③ shown in FIG. 17C. That is to say, at the A port side, the write data input from CPU 6 is applied and held at write data latch 53a via switch 55a. Meanwhile, at the B port side, no operation is performed because the read cycle has not yet started.

Next, when write control signal $\overline{W}$ (A) rises to the H level, external write cycle defining signal W (A) which is the inverted signal thereof, falls to the L level. Also, internal write cycle defining signal WE (A) rises to start the internal write cycle of A port. At this time at B port, the read cycle has not yet started. This state is similar to that of the aforementioned case 1, when the internal write cycle of A port commences. Therefore, the operation state of dual port RAM 50 at this time is the state of ④ shown in the aforementioned FIG. 17D. That is to say, the write data held in write data latch 53a is applied to sense amplifier 14a to be written into the selected memory cell of memory array 100. Meanwhile at the B port side, no operation is performed because the read cycle has not yet started.

Next, when read control signal $\overline{R}$ (B) falls to the L level, read data output control signal R (B) which is the inverted signal thereof, rises to the H level to commence the read cycle of B port. Also, in response to the fall of read control signal $\overline{R}$ (B), a one shot pulse is provided from falling detecting circuit 71b to set RS flipflop 76b. Consequently, read data fetching control signal RE (B) rises to the H level. The switching control signal SEL (B) is at the L level at this time. Meanwhile, there is no change in the operation state in the write operation control circuit of FIGS. 12B and 12C. Therefore, external write cycle defining signal W (A) maintains the L level, and internal write cycle defining signal WE (A) maintains the L level. Thus, select switch 58b selects the output of sense amplifier 14b because switching control signal SEL (B) is at the L level. Also, switch 57b is turned on because read data fetching control signal RE (B) is brought to the H level. Furthermore, tri-state buffer 59b is brought to a conductive state because read data output control signal R (B) turns to the H level. Therefore, the operation state of dual port RAM 50 at this time is the state of ⑨ shown in FIG. 17I. That is to say, at the A port side, the write data held in write data latch 53a is applied to sense amplifier 14a to be written into the selected memory cell. Meanwhile at the B port side, the read data output from sense amplifier 14b is provided to system bus 4 via read data latch 54b.

Next, when write operation allowable period defining signal $\overline{W}$ * (A) rises to the H level, internal write cycle defining signal WE (A) falls to end the internal write operation of A port. B port is in the middle of the read cycle at this time. This state is similar to the state of the aforementioned case 1 when the read cycle of B port starts. Therefore, the operation state of dual port RAM 50 at this time is the state of ① shown in FIG. 17A. That is to say, since internal write cycle has ended at the A port side, the operation thereof is completely halted. Meanwhile at the B port side, the read data output from sense amplifier 14b is provided to system bus 4 via read data latch 54b.

Thus in case 4, because the read cycle of B port commences after the start of the internal write cycle of A port, the data read out from the memory cell will not be indefinite even when access contention occurs. Therefore, the data read out from the memory cell is provided to system bus 4 via read data latch 54b.

Although the above operation has been described where contention occurs between the write access of the A port side and the read access of the B port side with respect to the same memory cell of memory cell array 100, a like operation is performed in a converse case where contention occurs between read access of the A port side and write access of the B port side with respect to the same memory cell, with only the relation between A port and B port conversed.

Next, the operation in the case where contention occurs between write access of the A port side and write access of the B port side with respect to the same memory cell in memory cell array 100. As mentioned before, the method of avoiding access contention is different between the write operation control circuit of FIG. 12B and the write operation control circuit of FIG 12C. That is to say, the write operation control circuit of FIG. 12B, gives priority to the later generated write access, when contention occurs between write access of the A port side and write access of the B port side. On the other hand, the write operation control circuit of FIG. 12C always gives priority to the write access of the A port side, when contention occurs between write access of the A port side and write access of the B port side.

Figure 18:
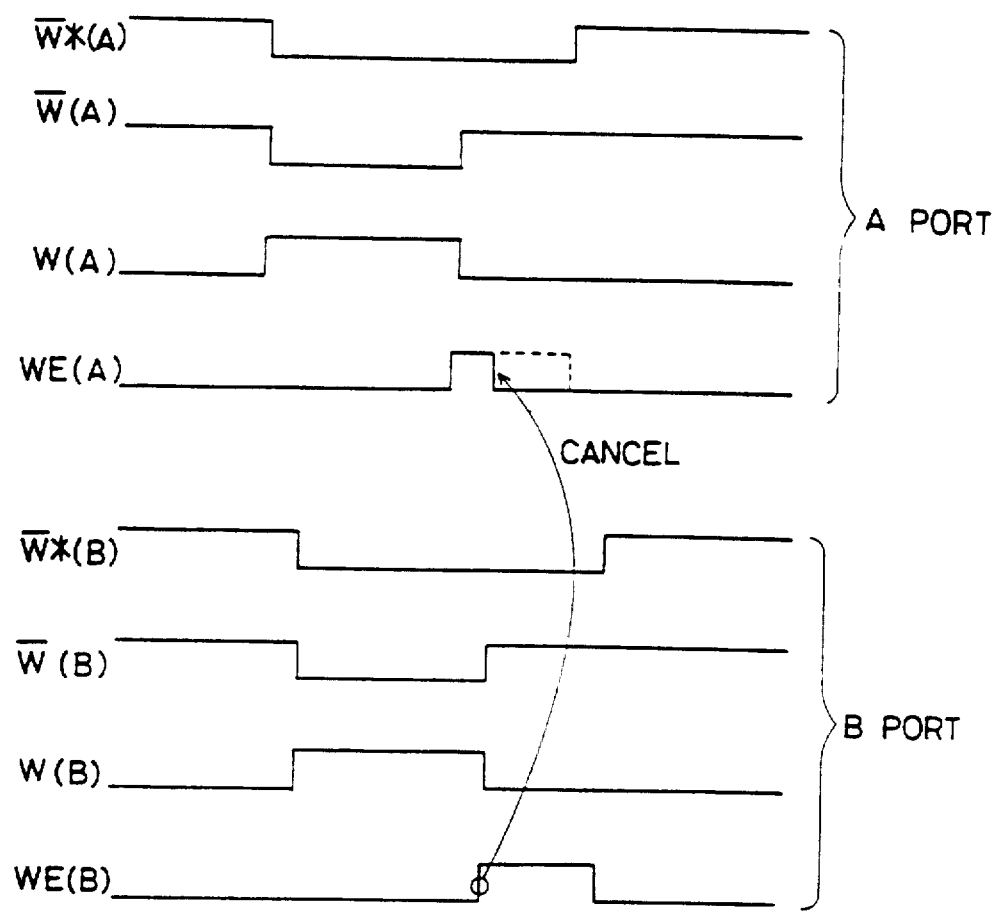
FIG. 18 is a timing chart for showing the operation of the write operation control circuit of FIG. 12B, when contention occurs between write access of the A port side and write access of the B port side with respect to the same memory cell.

FIG. 18 is a timing chart showing the operation of the write operation control circuit of FIG. 12B, when contention occurs between write access of the A port side and write access of the B port side with respect to same memory cell. Referring to FIG. 18, the operation of the write operation control circuit of FIG. 12B at the time of access contention will be first described. It is assumed that a write access of the A port side is first generated, followed by a generation of write access of the B port side during the internal write cycle. When the external write cycle of B port ends and external write cycle defining signal W (B) falls to the L level, a H level one shot pulse is provided from falling detecting circuit 82b to set RS flipflop 83b. This causes internal write cycle defining signal WE (B) to rise to the H level to start the internal write cycle of the B port side. In response to the rise of internal write cycle defining signal WE (B) to the H level, the output of AND gate 84a also rises to the H level. In response, an H level one shot pulse is provided from rise detecting circuit 85a. This one shot pulse is applied to RS flipflop 83a via OR grate 86a to reset RS flipflop 83a. This causes internal write cycle defining signal WE (A) to fall to the L level. That is to say, the internal write cycle of the A port side is forced to end, and the internal write cycle of the B port side is given priority. An operation similar to the aforementioned operation is performed in the case where the write access of the B port side is generated prior to the write access of the A port side, with only the relation between A port and B port reversed.

Figure 19:
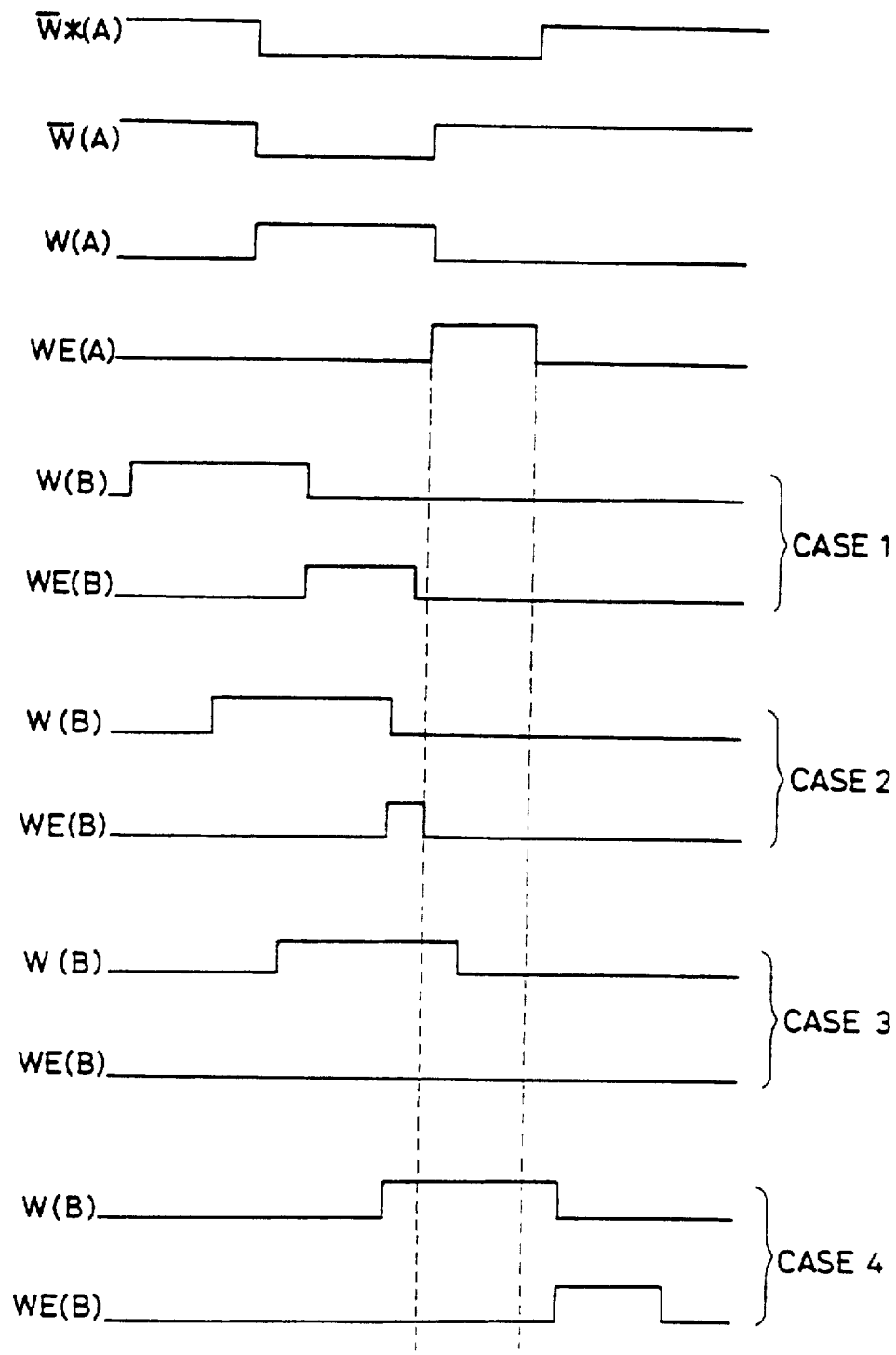
FIG. 19 is a timing chart showing the operation of the write operation control circuit of FIG. 12C, when contention occurs between write access of the A port side and write access of the B port side with respect to the same memory cell.

FIG. 19 is a timing chart showing the operation of the write operation control circuit of FIG. 12C, when contention occurs between write access of the A port side and write access of the B port side with respect to the same memory cell. Referring to FIG. 19, the operation of the write operation control circuit of FIG. 12C at the time of access contention will be explained. FIG. 19 shows four cases of access contention.

In FIG. 19, case 1 shows that the internal write cycle of the A port side starts after the termination of the internal write cycle of the B port side. There is no arbitration for access contenting because substantial write data contention with respect to the same memory cell does not exist.

Case 2 shows that the internal write cycle of the A port side starts during the internal write cycle of the B port side. In this case, the output of AND gate 87 rises to the H level in response to the rise of the internal write cycle defining signal WE (A). The rise of the output of AND gate 87 is applied to RS flipflop 83b via OR gate 86b to reset RS flipflop 83b. Accordingly, internal write cycle defining signal WE (B) falls to the L level. That is to say, the internal write cycle of the B port side is forced to terminate, and the internal write cycle of the A port side is given priority.

Case 3 shows the state in making an attempt to start the internal write cycle of the B port side during the internal write cycle of the A port side. In this case, RS flipflop 83b is not set because internal write cycle defining signal WE (A) and the access contention detection signal S1 from access contention detecting circuit 51 are the H level with the reset input end of RS flipflop 83b maintained at the H level in response, even when external write cycle defining signal W (B) falls to output an H level one shot pulse from falling detecting circuit 82b. That is, the start of the internal write cycle of the B port side is forced to be halted, and the internal write cycle of the A port side is given priority.

Case 4 shows that the internal write cycle of the B port side commences after the termination of the internal write cycle of the A port side. In this case, arbitration of access contention is not performed because writing data contention with respect to the same memory cell does not substantially exist, similar to that of the aforementioned case 1.

Because the contention between write access of the A port side and the B port side may be avoided by the external system side, the dual port memory of the present invention requires at least the function for arbitrating contention between a write access and a read access.

Thus, in accordance with the present invention, arbitration of access contention may be performed internally of the dual port memory, without issuing an access standby request at the external system side when access contention occurs. It is therefore possible to use this dual port memory in systems that can not handle access standby request. It will also be possible to develop a real time control system using dual port memories where real time is required.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A dual port memory transmitting data between a first system and a second system (6, 7) via first and second input/output ports, capable of being accessed simultaneously by said first and second systems (6, 7) comprising:

a memory cell array (100) having a plurality of memory cells, first memory cell selecting means (9a) for selecting one of the memory cells in said memory cell array (100) in response to address data supplied by said first system (6), second memory cell selecting means (9b) for selecting one of the memory cells in said memory cell array (100) in response to address data from said second system (7), access contention detecting means (51) for detecting contention between access of said first system (6) and access of said second system (7) with respect to the same memory cell in said memory cell array (100), control signal generating means (52) for generating control signals in accordance with the control data from said first and second systems (6, 7) and the output of said access contention detecting means, first transmission control means (53a-59a) responsive to said control signal for controlling the transmission of write data and read data between said first system (6) and said memory cell array, and second transmission control means (53b-59b) responsive to said control signal for controlling the transmission of write data and read data between said second system (7) and said memory cell array, said first transmission control means (52a-59a) comprising first read data selecting means (58a) for selectively supplying to said first system (6) data read out from the memory cell or the write data applied from said second system (7) in response to said access contention detecting means (51) detecting said contention, said second transmission control means (53b-59b) comprising second read data selecting means (58b) for selectively supplying to said second system (7) data read out from the memory cell or the write data applied from said first system (6) in response to said access contention detecting means (51) detecting said contention.

2. The dual port memory according to claim 1, wherein said first transmission control means (53a-59a) further comprises first write data holding means (53a) for temporarily holding the write data applied from said first system (6), and first write data applying means (56a) for applying the write data held in said first write data holding means (53a) to said memory cell array (100) after a predetermined time period, said second transmission control means (53b-59b) further comprises second write data holding means (53b) for temporarily holding the write data applied from said second system (7), and second write data applying means (56b) for applying the write data held in said second write data holding means (53b) to said memory cell array (100) after said predetermined time period.

3. The dual port memory according to claim 2, wherein said first read data selecting means (58a)

selects data read from the memory cell selected by said first memory cell selecting means (9a) as the read data to be supplied to said first system (6), in response to (i) said first system (6) initiating a memory read operation prior to said second system (7) supplying data to be written into said memory, and (ii) said first system (6) initiating a read operation during a time period in which write data to be written into said memory cell array (110) is held in said second write data holding means (53b) by said second write data applying means (56b), and selects the write data held in said second write data holding means (53b), as the read data to be supplied to said first system (6), in response to said first system initiating a memory read operation after data to be written into said memory from said second system (7) is stored in said second write data holding means (58b) and prior to application of held write data to said memory cell array (100) by said second write data applying means (56b), said second read data selecting means (58b)

selects data read from the memory cell selected by said second memory cell selecting means (58b) as the read data to be supplied to said second system (7), in response to (i) said second system (7) initiating a memory read operation prior to said first system (6) supplying data to be written into said memory, and (ii) said second system (7) initiating a read operation during a time period in which write data to be written into said memory cell array (100) is held in said first write data holding means (53a) by said first write data applying means (56a), and selects the write data held in said first write data holding means (53a), as the read data to be supplied to said second system (7) in response to said second system (7) initiating a memory read operation 96) is stored in said first write data holding means (58a) and prior to application of held write data to said memory cell array (100) by said first write data applying means (56a).

4. The dual port memory according to claim 3, wherein said first transmission control means (53a-59a) further comprises first read data holding means (54a) for holding the read data selected by said first read data selecting means (58a), and said second transmission control means (53b-59b) further comprises second read data holding means (54b) for holding the read data selected by said second read data selecting means (58b).

5. The dual port memory according to claim 4, wherein said first transmission control means (53a-59a) further comprises first read data maintaining means (57a) for preventing the modification of the read data held in said first read data holding means (54a) in response to the overwrite, when the stored data in the memory cell is overwritten, by the application of the write data held in said second write data holding means (53b) to said memory cell array (100) by said second write data applying means (56b), in the case where said first read data selecting means (58a) selects the data read out from the memory cell selected by said first memory cell selecting means (9a), and said second transmission control means (53b-59b) further comprises second read data maintaining means (57b) for preventing the modification of the read data held in said second read data holding means (54b) in response to the overwrite, when the stored data in the memory cell is overwritten, by the application of the write data held in said first write data holding means (53a) to said memory cell array (100) by said first write data applying means (56a), in the case where said second read data selecting means (58b) selects the data read out from the memory cell selected by said second memory cell selecting means (9b).

6. The dual port memory according to claim 5, wherein said first read data maintaining means (57a) comprises first switch means (57a) for blocking the signal path between said first read data selecting means (58a) and said first read data holding means (54a), and said second read data maintaining means (57b) comprises second switch means (57b) for blocking the signal path between said second read data selecting means (58b) and said second read data holding means (54b).

7. The dual port memory according to claim 1, wherein said first transmission control means (53a-59a) further comprises first write inhibiting means (56a) for inhibiting the write data applied from said first system (6) to be written to the memory cell, when write operation by said second system (7) is started during write operation of said first system (6) with respect to the same memory cell, and said second transmission control means (53a-59a) further comprises second write inhibiting means (56b) for inhibiting the write data applied from said second system (7) to be written into the memory cell, when write operation of said first system (6) is started during write operation of said second system (7) with respect to the same memory cell.

8. The dual port memory according to claim 1, wherein said first transmission control means (53a-59a) further comprises write inhibiting means (53a) for inhibiting the write data applied from said first system (6) to be written into the memory cell, when write operation of said second system (7) is started during write operation of said first system (6) with respect to the same memory cell, and when write operation of said first system (6) is started during write operation of said second system (7) with respect to the same memory cell.

9. A dual port comprising:

a memory cell array including first and second address decoders and first and second data input/output means;

first and second address data receiving means for respectively supplying first and second address data to said first and second address decoders;

collision detection means for detecting a coincidence of address data respectively applied at said first and second address receiving means and, in response, supplying an access collision signal;

first and second control signal input means for receiving control data including (i) first and second memory read control signals for receiving respective first and second memory data read requests, and (ii) first and second memory write control signals for receiving respective first and second memory write requests;

first and second data input/output means for (i) respectively receiving first and second input data to be written into said memory cell array and (ii) supplying respective data from said memory cell array;

first and second write data latches for respectively storing said first and second input data and selectively supplying said first and second input data to said first and second data input/output means, respectively, in response to respective first and second memory write control signals;

first read data latch means responsive to a first read source control signal for selectively storing (i) data read from said memory and provided at said first data input/output means and (ii) data stored in said second write data latch;

second read data latch means responsive to a second read source control signal for selectively storing (i) data read from said memory and provided at said second data input/output means and (ii) data stored in said first write data latch; and control means responsive to said control data and to said access collision signal for providing said first and second memory device write control signals and said first and second read control signals whereby, data applied to one of said data input/output means to be written into a designated location in said memory cell array is latched by a corresponding one of said write data latches in response to a previously received and continuing memory read operation to the corresponding other of said input/output means, said latched data being written into said memory cell array at a conclusion of said read operation, data applied to one of said data input/output means to be written into a designated location in said memory cell array is latched by a corresponding one of said write data latches in response to a previously received and continuing memory write operation from the corresponding other of said input/output means, said latched data being written into said memory cell array at a conclusion of said write operation, and data to be read from said memory cell array to one of said input/output means is supplied from the corresponding other of said write data latches when a data request is received during a write operation storing data applied at the other of said input/output means.

* * * * *